(12) United States Patent
Conybeare

(10) Patent No.: US 10,196,813 B2
(45) Date of Patent: Feb. 5, 2019

(54) WALL SYSTEM

(71) Applicant: INTELLIGENT CONSTRUCTION ENGINEERING SOLUTIONS LIMITED, London (GB)

(72) Inventor: Nigel Paul Conybeare, Hertfordshire (GB)

(73) Assignee: Intelligent Construction Engineering Solutions Limited, London (GB)

( * ) Notice: Subject to any disclaimer, the term of this patent is extended or adjusted under 35 U.S.C. 154(b) by 0 days.

(21) Appl. No.: 15/563,738

(22) PCT Filed: Mar. 31, 2016

(86) PCT No.: PCT/GB2016/050912
§ 371 (c)(1),
(2) Date: Oct. 2, 2017

(87) PCT Pub. No.: WO2016/156855
PCT Pub. Date: Oct. 6, 2016

(65) Prior Publication Data
US 2018/0073244 A1   Mar. 15, 2018

(30) Foreign Application Priority Data

Apr. 2, 2015 (GB) .................................. 1505735.9

(51) Int. Cl.
*E04B 1/61* (2006.01)
*E04B 1/76* (2006.01)
(Continued)

(52) U.S. Cl.
CPC .......... *E04B 1/7612* (2013.01); *E04B 1/6183* (2013.01); *E04B 1/7675* (2013.01);
(Continued)

(58) Field of Classification Search
CPC .... E04B 1/7612; E04B 1/7675; E04B 1/6183; E04B 2/822; E04C 2/521
See application file for complete search history.

(56) References Cited

U.S. PATENT DOCUMENTS

| 1,492,327 | A | * | 4/1924 | Keppler | .................... | E04B 2/78 |
| | | | | | | 52/243.1 |
| 3,072,975 | A | * | 1/1963 | Burmeister | ............. | E04B 2/827 |
| | | | | | | 105/155 |

(Continued)

FOREIGN PATENT DOCUMENTS

| CH | 523 393 A | 5/1972 |
| DE | 25 10 949 A1 | 9/1976 |

(Continued)

OTHER PUBLICATIONS

International Search Report and Written Opinion of the International Searching Authority (PCT/GB2016/050912) dated Jul. 6, 2016, 11 pages.

(Continued)

*Primary Examiner* — Rodney Mintz
(74) *Attorney, Agent, or Firm* — Burr & Brown, PLLC

(57) ABSTRACT

A modular wall comprising at least two wall panels, each comprising first and second vertical edges, a top edge and a bottom edge. A leg is connectable to a wall panel, configured to apply a vertical force on the wall panel. The first and second vertical edges are shaped to form a male-female connection between adjacent wall panels. Adjacent wall panels are joined together using adhesive. Each vertical edge is provided with cooperating elements, which in use engage with a cooperating element on an adjacent wall panel to pull the two wall panels together whilst the adhesive cures.

31 Claims, 26 Drawing Sheets

(51) Int. Cl.
*E04B 2/82* (2006.01)
*E04C 2/52* (2006.01)
*F24D 3/14* (2006.01)

(52) U.S. Cl.
CPC .............. *E04C 2/521* (2013.01); *E04B 2/822* (2013.01); *F24D 3/142* (2013.01)

(56) References Cited

U.S. PATENT DOCUMENTS

| | | | | |
|---|---|---|---|---|
| 3,453,789 A | * | 7/1969 | Stephenson | E04B 2/822 |
| | | | | 52/126.3 |
| 3,566,559 A | * | 3/1971 | Dickson | E04B 2/78 |
| | | | | 52/126.4 |
| 3,884,002 A | | 5/1975 | Logie | |
| 4,103,463 A | * | 8/1978 | Dixon | E04B 2/824 |
| | | | | 52/126.4 |
| 4,263,761 A | * | 4/1981 | Kristoff | E04B 2/7429 |
| | | | | 160/351 |
| 4,277,920 A | * | 7/1981 | Dixon | E04B 2/824 |
| | | | | 49/321 |
| 4,299,067 A | | 11/1981 | Bertschi | |
| 4,450,658 A | * | 5/1984 | Legeai | E04B 2/7409 |
| | | | | 52/126.3 |
| 4,454,690 A | * | 6/1984 | Dixon | E04B 2/824 |
| | | | | 52/126.3 |
| 5,005,325 A | * | 4/1991 | Dull | E04B 2/7425 |
| | | | | 248/188.4 |
| 5,042,555 A | * | 8/1991 | Owens | E04B 2/827 |
| | | | | 160/116 |
| 5,159,793 A | * | 11/1992 | Deugo | E04B 2/7409 |
| | | | | 52/126.1 |
| 6,299,224 B1 | | 10/2001 | Finkelstein | |
| 8,079,188 B2 | * | 12/2011 | Swartz | E04H 9/10 |
| | | | | 52/167.1 |
| 9,222,255 B2 | * | 12/2015 | Johnson | E04B 2/827 |
| 2004/0123548 A1 | | 7/2004 | Gimpel et al. | |
| 2011/0173902 A1 | | 7/2011 | Hohmann, Jr. et al. | |
| 2014/0033631 A1 | | 2/2014 | Rokk et al. | |
| 2015/0033642 A1 | * | 2/2015 | Johnson | E04B 2/827 |
| | | | | 52/173.1 |

FOREIGN PATENT DOCUMENTS

| | | |
|---|---|---|
| DE | 296 16 928 U1 | 11/1996 |
| DE | 199 09 391 | 9/2000 |
| EP | 2 345 769 A2 | 7/2011 |
| FR | 2 032 194 A5 | 11/1970 |
| GB | 2 348 924 A | 10/2000 |
| GB | 2 488 176 A | 8/2012 |
| JP | 03-183841 A | 8/1991 |
| JP | 2002-138597 A | 5/2002 |
| KR | 2010-0011234 U | 11/2010 |
| WO | 93/21406 | 10/1993 |

OTHER PUBLICATIONS

GB Search Report (GB1605464.5) dated Sep. 25, 2016, 2 pages.
GB Search Report (GB1505735.9) dated Aug. 3, 2015, 2 pages.

* cited by examiner

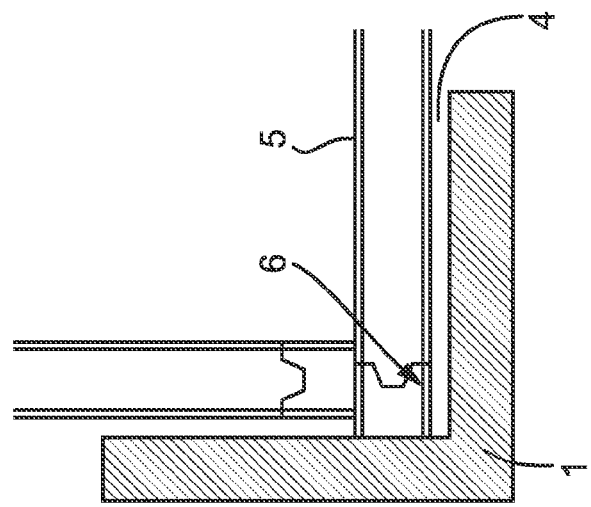
Fig. 1.3
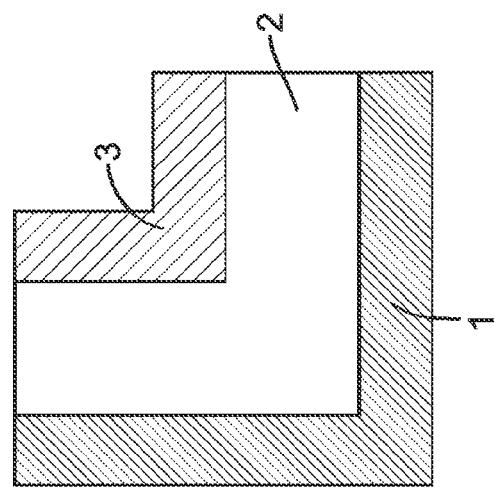
Fig. 1.2
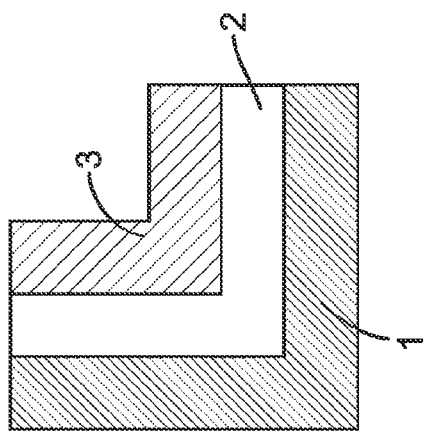
Fig. 1.1

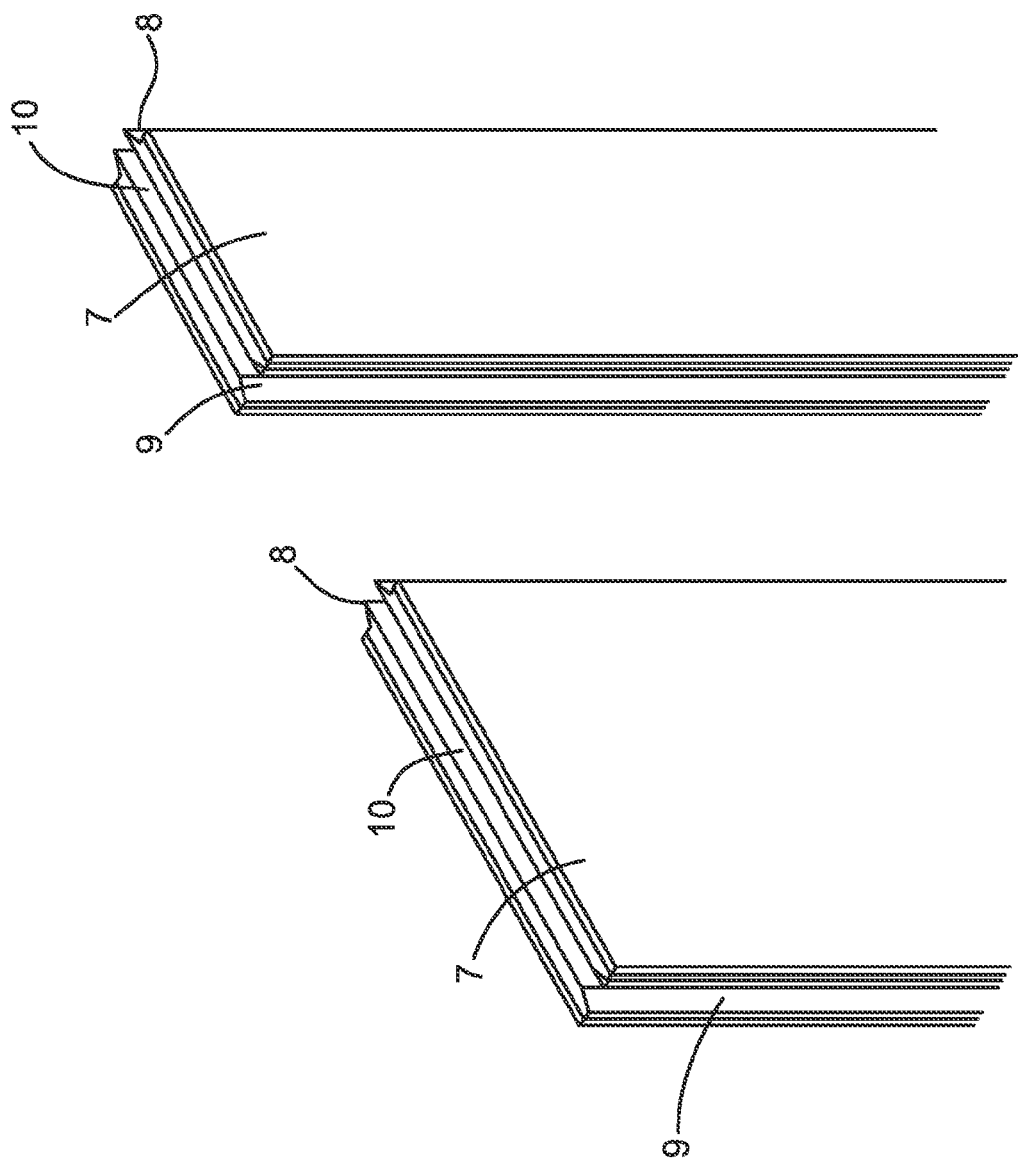

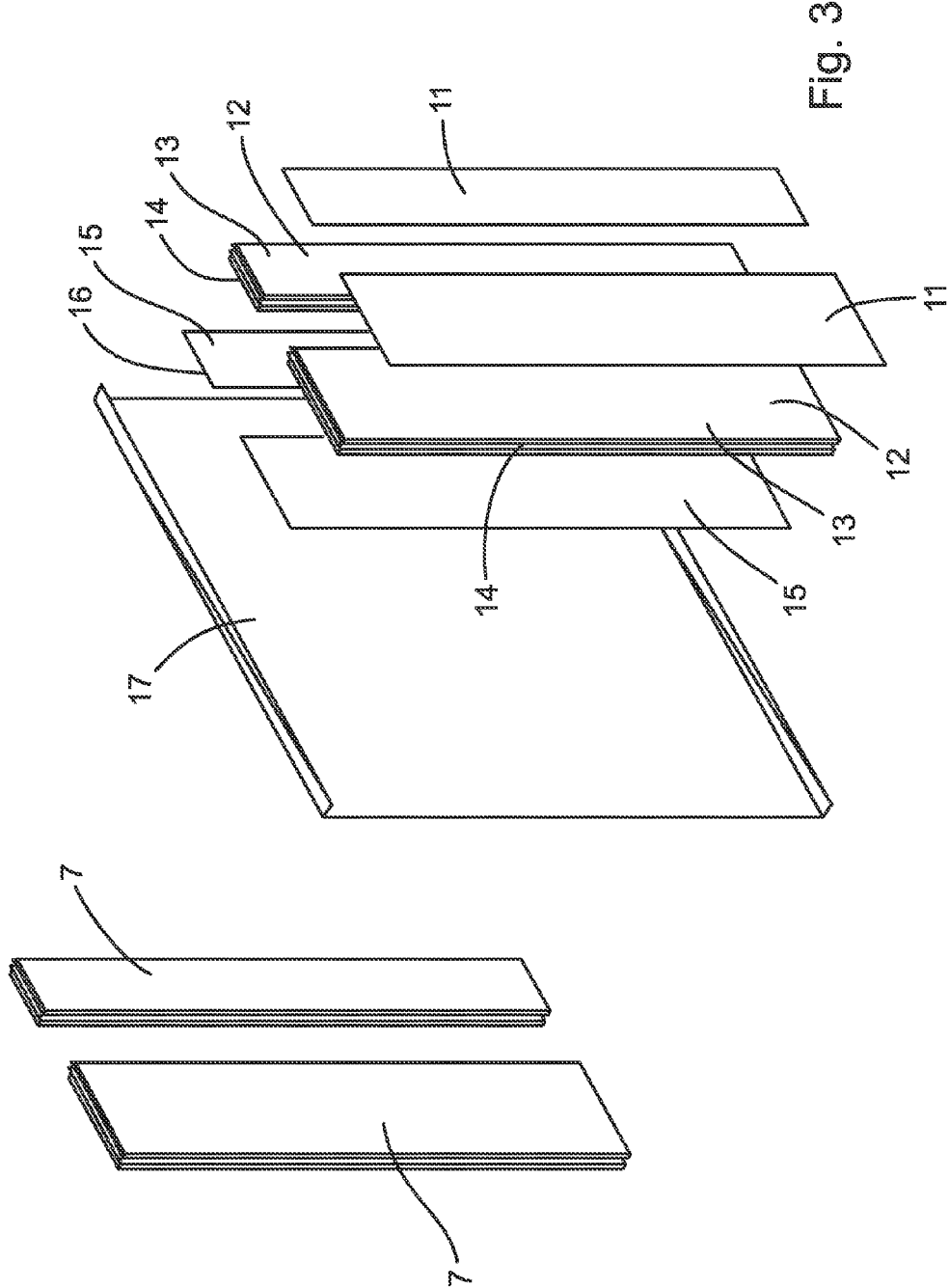

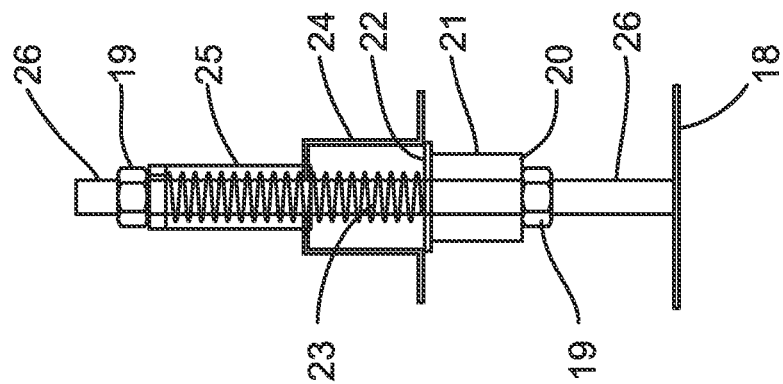
Fig. 4.3
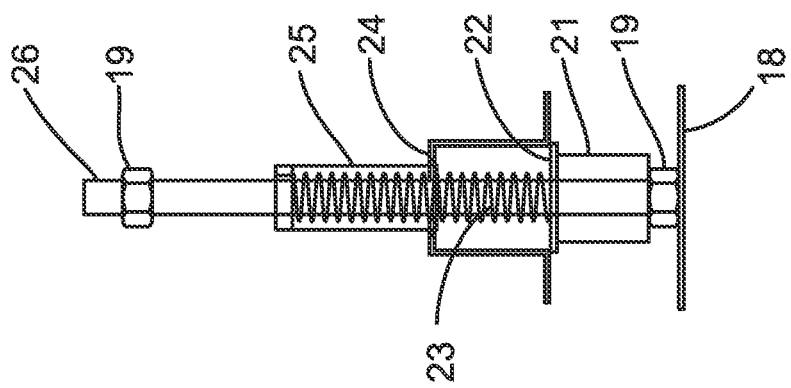
Fig. 4.2
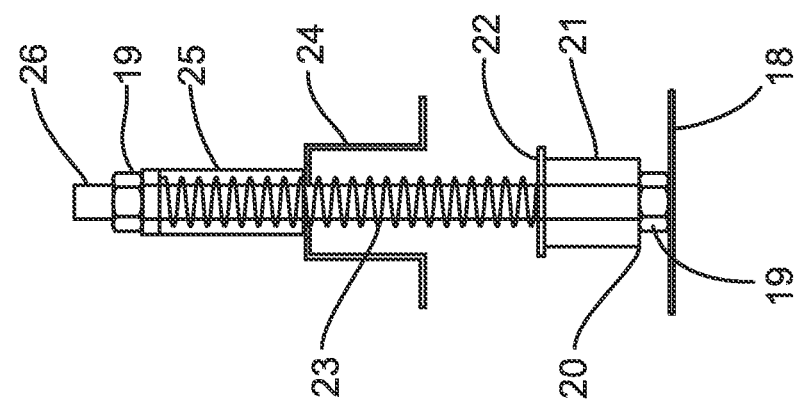
Fig. 4.1

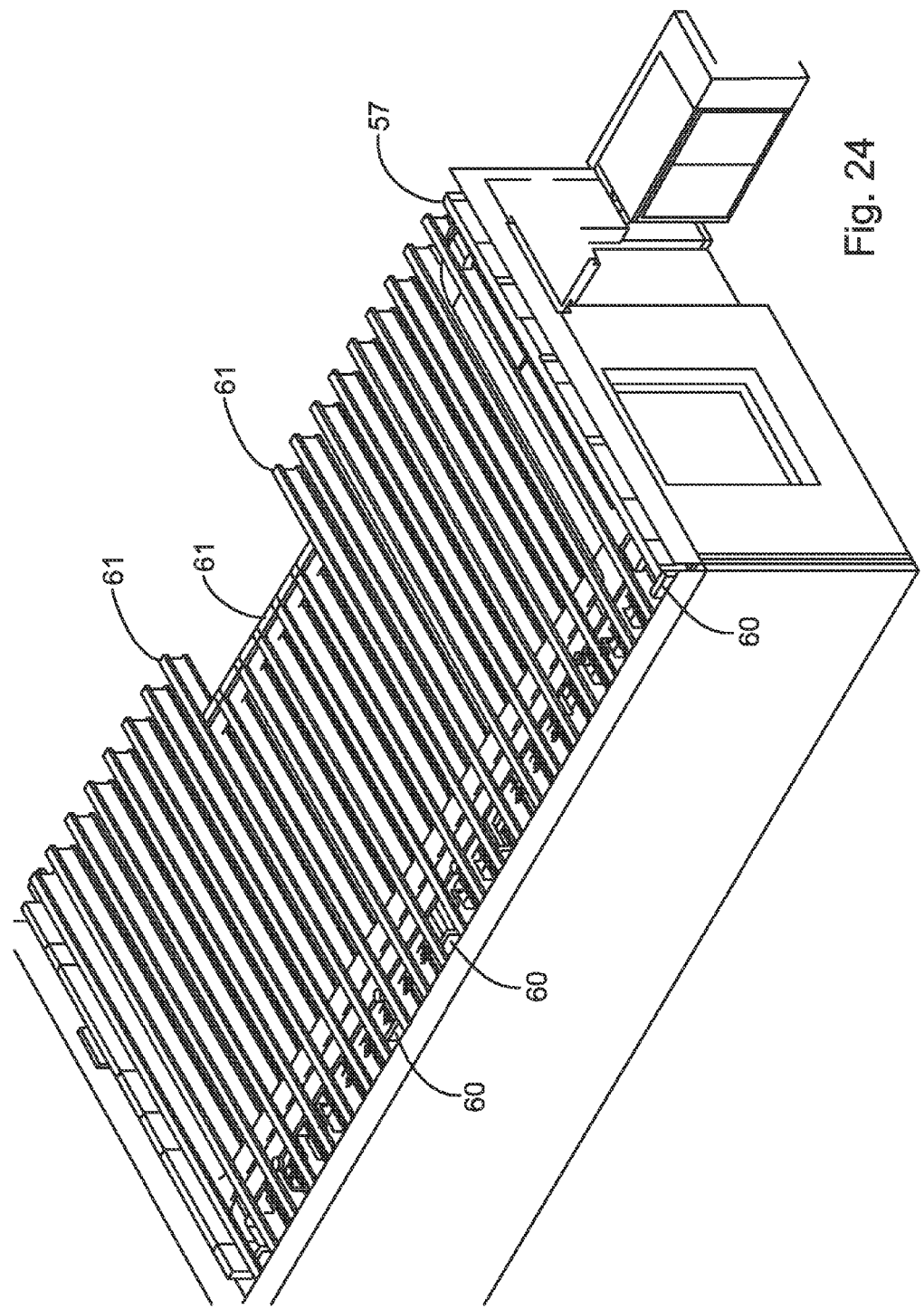

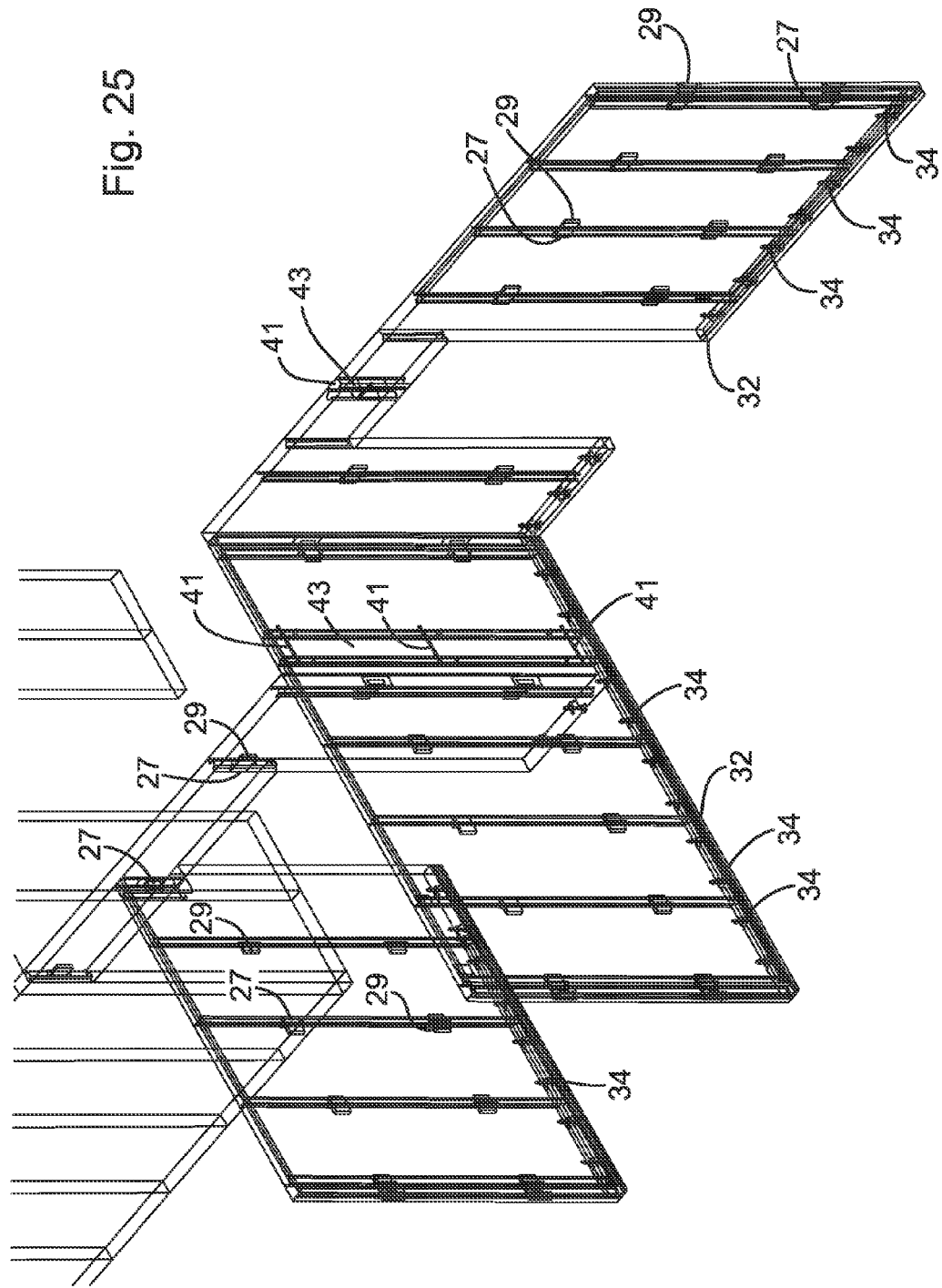

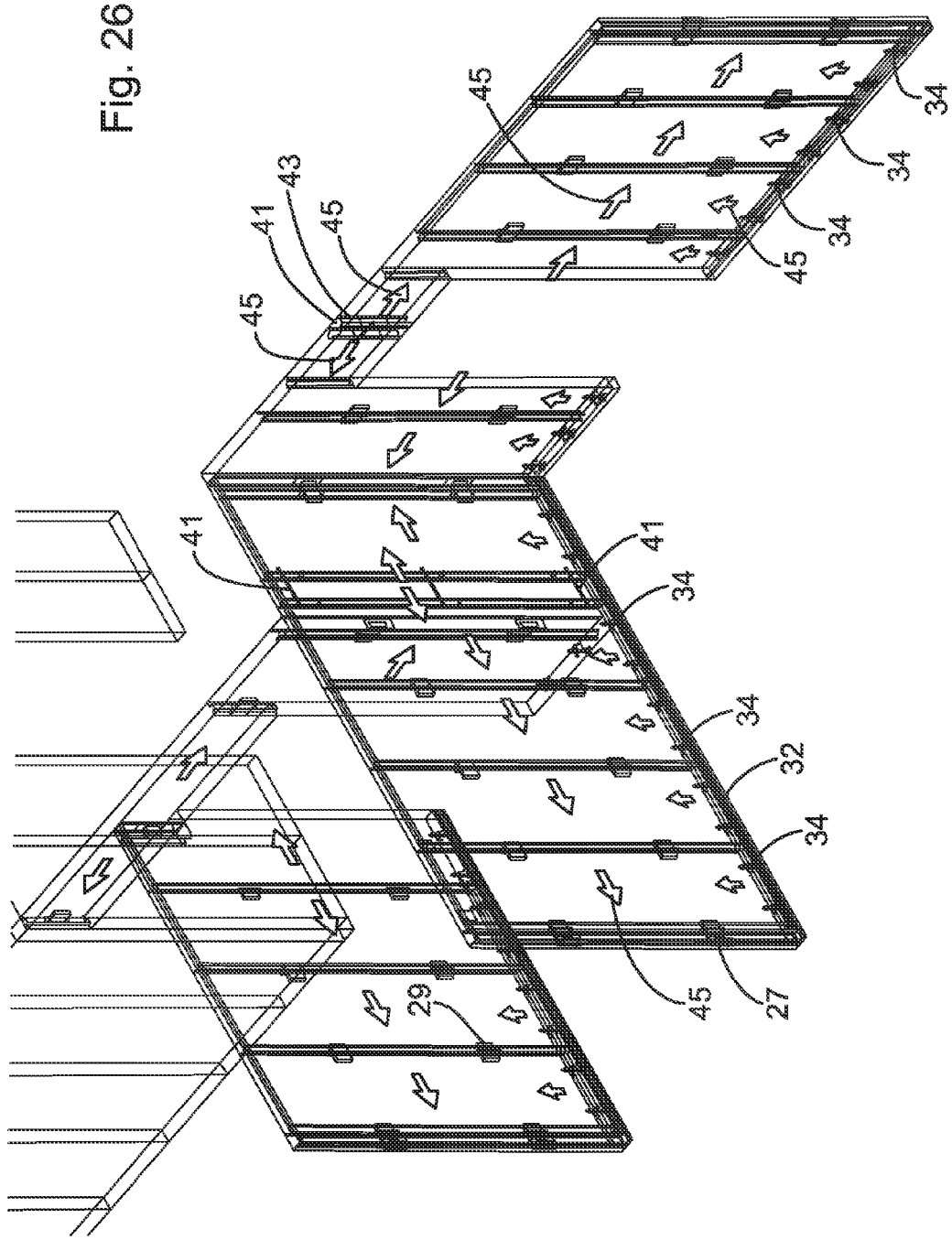

WALL SYSTEM

FIELD OF THE INVENTION

This invention relates to a walling system, wall panels using in the system and a method or assembling the walling system. The invention also relates to a building constructed using the walling system.

BACKGROUND TO THE INVENTION

The way that buildings have been built has not changed in many years. However there is a need to improve the performance of buildings driven by the need to reduce heating bills and, by association, the reduction of carbon dioxide in the atmosphere which effects global warming and climate change.

A building is constructed in a way that tries to maintain a comfort level where people can live and be sheltered from the elements. Ideal living conditions are neither to hot or too cold, irrespective of the climate which could be too hot, too cold or to wet.

In order to maintain this comfort level, the interior living conditions need to be either heated or cooled. It is desirable that the energy used is minimized, whilst still maintaining the comfort level. This can be achieved by insulating the building. It is desirable to make the building more air tight to reduce heat loss. It is also desirable to stop noise pollution from either the outside of the building or from the inside of the building.

When a building is thermally efficient and air tight, there is an increased risk that humidity can increase in the building which can cause condensation. Standard or interstitial condensation carries the risk of leading to detrimental degrading of the building fabric.

Conventional buildings are typically constructed using a cavity wall, comprising outer and inner leaves (typically but not necessarily masonry) and a cavity between them. The cavity is typically filled with an insulation material. This conventional way of constructing walls has the disadvantage of having thermal bridges where the inner and outer leaves are coupled together by ties; these thermal bridges between the cold exterior surface and the warm interior surface (or vice versa) provide a bridge along which heat, sound, fire and moisture can travel.

It is known to construct a building using modular panels which are pre-fabricated and assembled on site. The off-site manufacture of these modular panels is typically to a much higher tolerance (+/−1 or 2 mm (+/−0.04 or 0.08 in) than used in the construction process (+/−25 mm (0.98 in)). This disparity can lead to adjustment of the panels being required when installed on-site. This problem particularly arises with the positioning of windows and doors.

Services, such as electricity, water and heating/cooling are typically installed once the building shell has been constructed. To install these services, channels in the internal leaf of the walls are chased out and the necessary wiring, conduits or pipework fitted. This has the disadvantage that air bridges may be introduced, reducing the air-tightness of the building. This disadvantage is further increased in buildings using pre-fabricated panels; in this case part of the insulation may be chased out, reducing the insulation of the panel and also potentially introducing holes in the panel, resulting in air flow through the panel.

STATEMENTS OF THE INVENTION

The present invention relates to a system for the construction of a building which increases the efficiency of the building resulting in reduced energy loss, increased acoustic performance and mitigates the risk of condensation.

An aspect of the present invention provides a modular wall panel comprising:
- a wall panel, comprising first and second vertical edges, a top edge and a bottom edge;
- a leg connectable to the wall panel, configured to apply a vertical force on the wall panel, wherein the leg has an adjustment position in which the spring force is applied by a spring and a load bearing position in which the spring force is applied by a damper assembly, wherein the spring force of the damper assembly is larger than the spring force of the spring.

The leg may comprise a spring, damper assembly and base; wherein in the adjustment position, the load path from the wall panel to the floor is through the spring, damper assembly and base; and wherein in the load bearing position, the load path from the wall panel to the floor is through the damper assembly and base.

In the adjustment position the wall panel may be spaced from the damper assembly, with the spring extending between them; and in the load bearing position the wall panel may be in contact with the damper assembly. The wall panel may be in direct contact with the damper assembly or in contact via another component, such as a bracket.

The first and second vertical edges may be shaped to form a male-female connection between adjacent wall panels; wherein each vertical edge is provided with cooperating elements, which in use engages with a cooperating element on an adjacent wall panel to pull the two wall panels together. The cooperating elements may comprise a cam action to pull the two wall panels together.

One of the first and second edges of the wall panel may be provided with a vertical groove on its front face, to allow space for adhesive and/or filler.

The wall panel may comprise a laminate structure, comprising a facing layer and an insulation layer. The first and second edges may be provided with male and female profiles which extend into the insulation layer. Conduit, wiring and/or pipework may be integrated into the laminate structure. A protective cover plate may cover the conduit, wiring and/or pipework.

A further aspect of the invention provides a modular wall comprising:
- at least two wall panels, each comprising first and second vertical edges, a top edge and a bottom edge;
- a leg connectable to at least one wall panel, configured to apply a vertical force on the wall panel,
- wherein the leg has an adjustment position in which the spring force is applied by a spring and a load bearing position in which the spring force is applied by a damper assembly, wherein the spring force of the damper assembly is larger than the spring force of the spring.

The leg may comprise a spring, damper assembly and base;
- wherein in the adjustment position, the load path from the wall panel to the floor is through the spring, damper assembly and base; and
- wherein in the load bearing position, the load path from the wall panel to the floor is through the damper assembly and base.

In the adjustment position the wall panel may be spaced from the damper assembly, with the spring extending between them; and in the load bearing position the wall panel may be in contact with the damper assembly.

The first and second vertical edges may be shaped to form a male-female connection between adjacent wall panels; adjacent wall panels may be joined together using adhesive; each vertical edge may be provided with cooperating elements, which in use engage with a cooperating element on an adjacent wall panel to pull the two wall panels together whilst the adhesive cures.

The modular wall is in compression both vertically and horizontally.

The cooperating elements may comprise a cam action to pull the two wall panels together.

One of the first and second edges of the wall panel may be provided with a vertical groove on its front face, to allow space for adhesive and/or filler.

The wall panel may comprise a laminate structure, comprising a facing layer and an insulation layer. The first and second edges may be provided with male and female profiles which extend into the insulation layer. Conduit, wiring and/or pipework for services may be integrated into the laminate structure. A protective cover plate may be provided, covering the conduit, wiring and/or pipework.

The modular wall may comprise at least one spreader bracket to push two adjacent wall panels apart. The modular wall may comprise a cover strip to cover the gap created by the spreader bracket.

The modular wall may be positioned in front of an existing wall and a sealed cavity is created between the existing wall and the modular wall.

The modular wall may comprise a ventilation system, wherein an inlet and/or outlet of the ventilation system is located in a wall panel, an air source is provided into the sealed cavity and wherein the sealed cavity acts as an air plenum for the ventilation system.

A further aspect of the present invention comprises a method of erecting a modular wall panel or erecting a modular wall, the method comprising:
putting the legs into the adjustment position whilst the modular panels are positioned and connected to each other;
putting the legs into the load bearing position when the modular panels are in position.

The method may comprise:
applying adhesive to the first and second vertical edges;
positioning the wall panels in their desired location;
engaging cooperating elements in adjacent wall panels and allowing the adhesive to cure
whilst the adjacent wall panels are clamped together.

The method may comprise:
filling a vertical groove on the front face of the wall panel at one of the first and second edges with adhesive and/or filler;

The method may further comprise removing excess adhesive and/or filler to leave a flush front surface of the modular wall.

The method may comprise inserting a spreader bracket between adjacent wall panels to force them apart. The spreader bracket thereby takes up any tolerance.

A further aspect of the present invention provides a modular wall comprising:
At least two wall panels, each comprising first and second vertical edges, a top edge and a bottom edge;
a leg connectable to a wall panel, configured to apply a vertical force on the wall panel;
wherein the first and second vertical edges are shaped to form a male-female connection between adjacent wall panels;
wherein adjacent wall panels are joined together using adhesive;
wherein each vertical edge is provided with cooperating elements, which in use engage with a cooperating element on an adjacent wall panel to pull the two wall panels together whilst the adhesive cures.

According to a further aspect of the present invention there is provided a wall panel for a modular wall system, said wall panel comprising:
a panel comprising two opposite vertical edges and wherein each vertical edge is provided with cooperating elements, which in use engage with a cooperating element on an adjacent wall panel to pull the two wall panels together.

The cooperating elements apply a horizontal stress to the first and second wall panels whilst adhesive applied between the wall panels sets.

The use of cooperating elements to pull adjacent wall panels together results in a strong modular wall; the resulting modular wall is sufficiently strong to form a self-supporting structure. The use of cooperating elements to pull adjacent wall panels together enables an air tight seal to be formed between adjacent wall panels.

The wall panel has the advantage that its structure is not dense and does not take up large amounts of floor space in achieving the strength and thermal performance.

The wall panel has the advantage that it allows the modular wall to be built on site quickly, whilst maintaining the integrity of the modular wall (i.e. it maintains quality when assembled quickly on site).

The cooperating elements may comprise a cam action to pull the two wall panels together. The cooperating elements may comprise the components of a cam lock. The cooperating elements may comprise a hook cam lock.

The action of the cooperating elements applies tension forces to the wall panel in the horizontal direction.

The wall panel may comprise at least one leg which in use biases the wall panel upwards.

The biasing action of the at least one leg applies compression forces to the wall panel in the vertical direction.

The at one least leg may comprise a rod on which is mounted a load bearing bracket, a spring, a damper assembly and base;
wherein the leg has an adjustment position in which the load path from the modular wall panel to the floor is through the load bearing bracket, spring, damper assembly and base; and
wherein the leg has a load bearing position in which the load path from the modular wall panel to the floor is through the load bearing bracket, damper assembly and base.

This arrangement allows the spring's relatively large deflection during installation of the panel but removes the spring from the load path once the panel has been installed, relying on the more durable damper.

In the adjustment position the load bearing bracket may be spaced from the damper assembly with the spring extending there between and in the load bearing position the load bearing bracket may be in contact with the damper assembly.

The spring force of the damper may be larger than the spring force of the spring.

The damper assembly may comprise a damper selected from a mechanical or hydraulic damper. The damper assembly may comprise a resilient material, for example a rubber based material.

The wall panel may comprise an insulation layer, a facing layer and vapour control membrane between the insulation layer and a facing layer.

In one embodiment, the wall panel has an extremely strong and tough facing skin as part of the lamination. The facing skin is non-paper faced so that it will not propagate the growth of mould or fungal growth. It is very smooth, fire proof and will not require costly time consuming plastering.

The facing layer may comprise gypsum fibre board. The facing layer may comprise non-paper faced gypsum fibre board.

The insulation layer may comprise a closed cellular structural expanded foam that traps gas within the cells such that it is a barrier to heat transference and has increased thermal resistance.

The modular wall panel may comprise a backing layer and a vapour control layer between the backing layer and the insulation layer. The backing board may comprise gypsum fibre board.

The wall panel may comprise conduit for electrical wiring within the insulation layer. The wall panel may comprise a heating and/or cooling system within the insulation layer. The heating and/or system may comprise pipework for the flow or hot or cold fluid. The heating and/or cooling system may comprise a protective cover plate. The protective cover plate may be thermally conductive. The protective cover plate may comprise a metallic material.

In a new build environment, the sequence of the build is such that floor joist are exposed. The modular panels are installed prior to the ceiling being installed. All services are run within the floor joist and connected within the void to the services that have been integrated within the panel, when the panel was being manufactured. All services that have been factory fitted within the panel will have been tested for compliance prior to shipment to site.

Another aspect of the present invention provides a modular wall comprising two or more wall panels according to the above aspect, wherein the cooperating elements of adjacent wall panels are engaged.

Said two or more wall panels may comprise three or more wall panels and wherein the modular wall may comprise at least one spreader bracket to push two adjacent wall panels apart, thereby adjusting the position of the adjacent wall panels. The modular wall may comprise a cover strip to cover the gap created by the spreader bracket. The modular wall may comprise a window and/or door opening and wherein the spreader bracket may be used to adjust the position of wall panels adjacent the window and/or door opening above and/or below the window and/or door opening.

The action of the spreader bracket applies compression forces to adjacent wall panels.

Forces vary throughout the assembled modular wall; in the region of the joins between adjacent wall panels, the modular wall tends to be in tension but in the area of the spreader brackets it tends to be in compression. This combination of tension and compression enables the assembled wall to cope with both tension and compression forces applied by an adjacent inherited structure. By creating pent up forces within the assembled wall, a sealed cavity can be maintained behind the modular wall even if there is movement of the inherited structure. This resilience in the modular wall is due to the pent-up forces within it rather than relying on it being horizontally biased against an inherited structure by springs and the like.

A further aspect of the present invention provides a wall structure comprising:

An external wall;

An internal modular wall according to an earlier aspect of the invention arranged in front of the wall; and a sealed cavity between the wall and the modular wall.

This design limits thermal bridges, for example air paths from the external to the internal elements of a building. In addition, potential areas where materials bridge or transmit from the external wall to the internal modular wall are either eliminated or reduced so that they do not affect the overall performance of the building.

The modular wall may be independent of the wall, i.e. it is not mounted on the wall. The modular wall of the present invention has the advantage that it is sufficiently strong to be independent of the wall.

The use of cooperating elements to pull adjacent wall panels together enables an air tight seal to be formed between adjacent wall panels, thereby enabling the sealed cavity to be formed behind it.

The modular wall may extend the full height and width of the wall.

The present invention has the advantage that the air cavity can be very slim, as long as there are no bridges, resulting in the overall system being much slimmer than prior art wall structures.

The present invention has the advantage that the insulation is provided on the inner modular wall, i.e. the insulation is as close to the living area as possible so that that the thermal perimeter of the inner living space is protected by the resistance of thermal transfer. The insulation will aid in keeping either the heat or coolness inside the living space.

The wall structure may comprise:
 a ducting system to provide ventilation to the internal areas of a building defined by the wall structure;
 an inlet and outlet from the ducting system to the sealed cavity, so that the sealed cavity acts as an air plenum for air supply and extraction to the ducting system.

At least one of the one or more wall panels may comprise an inlet and/or outlet joining the ducting system to the sealed cavity.

The wall structure may comprise an air source into the sealed cavity. The air source may comprise a vent through the external wall. The wall structure may comprise an air outlet from the sealed cavity, wherein the air source and air outlet may be located on different sides of the building. The sealed cavity may be subdivided into sections, with channels between them to allow limited air flow.

A further aspect of the present invention provides a method of erecting a modular wall panel, said modular wall panel comprising a wall panel according to the earlier aspect of the invention, the method comprising:
 erecting a first wall panel;
 erecting a second wall panel and placing it adjacent the first wall panel;
 engaging cooperating elements so that the panels are pulled together.

The method may comprise applying adhesive to vertical edges of the panels and allowing it to cure whilst the panels are held together by the engaging cooperating elements.

A further aspect of the present invention provides a method of erecting a modular wall panel, said modular wall panel comprising a wall panel according to the earlier aspects of the invention, the method comprising:
 erecting a first wall panel;
 erecting a second wall panel and placing it adjacent the first wall panel;

applying adhesive to at least one of the first or second wall panels on a surface which in use abuts the adjacent first or second wall panel when assembled; and
applying a horizontal stress to the first and second wall panels whilst the adhesive sets.

The horizontal stress may be applied by engaging cooperating elements as described. The horizontal stress may be applied by the use of a spreader brackets located between the second wall panel and a third panel, the spreader bracket exerting a force to push the second and third wall panels apart. The force exerted by the spreader bracket on the second wall panel will apply a horizontal stress to the first and second wall panels.

The method may further comprise applying a vertical stress to the first and second wall panels whilst the adhesive sets.

By pre-stressing the first and second wall panels, this method creates a very strong structure.

The first wall panel may comprise a leg and the method may comprise:
  fixing a header track to an overhead structure;
  fixing a base track to the floor; and
  the step of erecting a first panel may comprise:
    placing the leg into the base track;
    putting leg into the adjustment position;
    compressing spring to place top of first wall panel below header track;
    allowing spring to push first panel upwards, locating top of panel in header rail; and
    putting leg into load bearing position.

A further aspect of the present invention provides a leg for a modular wall panel, the leg comprising:
  a rod on which is mounted a load bearing bracket, a spring, damper assembly and base;
  wherein the leg has an adjustment position in which the load path from the modular wall panel to the floor is through the load bearing bracket, spring, damper assembly and base; and
  wherein the leg has a load bearing position in which the load path from the modular wall panel to the floor is through the load bearing bracket, damper assembly and base.

The present invention uses the advantage of a large displacement of the spring to be used during installation of each wall panel, whilst utilizing the smaller displacement but higher durability of the damper once the panel is installed.

In the adjustment position the load bearing bracket may be spaced from the damper assembly, with the spring extending between them. In the load bearing position the load bearing bracket may be in contact with the damper assembly. In the load bearing position, the spring may not form part of the load path.

The spring force of the damper may be larger than the spring force of the spring. The spring force of the damper may be within the range of a calculated percentage over and above the total weight of the panel (individual) and the total wall length of the elevation such that deformation of the damper by imposed load is within these design parameters such that if building movement occurs the damper absorb this movement without deformation of the walling panel.

The damper assembly may comprise a damper selected from a mechanical or hydraulic damper. The damper assembly may comprise a resilient material, for example a rubber based material or a polymer such as polyurethane. The damper may not comprise a coil spring. The spring may comprise a coil spring.

The damper assembly may comprise an adjustment device to adjust its position on the rod.

The rod may have a longitudinal axis and wherein the load bearing bracket, spring and damper assembly may be all moveable along the longitudinal axis of the rod The rod may have a stop at an upper end.

In the load bearing position, there may be a line of contact between the stop, load bearing bracket and damper assembly.

The load bearing bracket may comprise a sleeve at an upper end which encloses the spring.

A further aspect of the present invention provides a modular wall panel comprising a leg according to the above aspect of the invention.

A further aspect of the present invention provides a method of erecting a modular wall panel, said modular wall panel comprising a leg according to the earlier aspect, the method comprising:
  fixing a header track to an overhead structure;
  fixing a base track to the floor;
  putting the leg into the adjustment position;
  placing the leg into the base track;
  compressing the spring to place the top of the modular wall panel below the header track;
  allowing the spring to push the panel upwards, locating the top of the panel in the header rail; and
  putting the leg into the load bearing position.

A further aspect of the present invention provides a modular wall comprising three or more wall panels and at least one spreader bracket to push two adjacent wall panels apart, thereby adjusting the position of the adjacent wall panels.

The present invention reduces or eliminates the need for cutting of the panel on-site to make adjustments, in particular for door and/or window position. In this way build quality and design integrity is maintained without the influence of on-site adjustment that could affect the overall performance of the system.

The three or more wall panels may in use define a window or doorway opening between them.

At least one of the three or more panels may comprise a panel located above or below a window or doorway opening.

The modular wall may comprise a cover strip to cover the gap created by the spreader bracket.

At least two of said three or more wall panels may comprise cooperating elements to pull them together. The cooperating elements may comprise a cam action to pull the two wall panels together. The cooperating elements may comprise the components of a cam lock. The cooperating elements may comprise a hook cam lock.

The modular wall may comprise a head and/or base track and wherein in use the top and/or bottom of the wall panels fit into the head and/or base track.

The modular walls of the present invention may be used for both external walls and internal walls (e.g. partition walls) of a house. The modular walls therefore need flexibility to cope with forces along the X,Y and Z directions. The spreader bracket has several advantages for either a single modular wall or a whole house system comprising multiple modular walls.

The spreader bracket allows the wall panels which are pre-fabricated to a high tolerance (typically +/−1 or 2 mm (+/−0.04 or 0.08 in)) to be adjusted to fit the lower building tolerance on-site (which is typically +/−25 mm (0.98 in)). The spreader brackets therefore compensate for inaccuracies in measurement.

Use of spreader brackets has the additional advantage that it allows on-site adjustment which enables the wall panels to be designed in the most economical way to suit the overall house and allowing the standard width panels to be optimised.

A further advantage is that use of spreader brackets allows the horizontal load path of the wall to be changed. This change in load path can be modeled, so that the modular wall can cope with tension and compression forces from both the inherited structure and the new wall division structure (partitions) that are applied to any one wall of the new build. In effect, the spreader brackets may be used to create optimisation of geodetic forces, such that all compression and tensile forces collaborate to disburse an imposed load.

A further aspect of the present invention provides a method for adjusting the position of panel in a modular wall, the method comprising:
  erecting three or more wall panels; and
  inserting a spreader bracket between adjacent wall panels to thereby adjust their position.

The method may comprise covering the spreader bracket with a cover strip.

The three or more wall panels in use may define a window or doorway opening between them and wherein the step of inserting a spreader bracket between adjacent wall panels may adjust the position of the window or doorway opening.

A further aspect of the present invention provides a modular wall panel for a modular wall system, said modular wall panel comprising:
  An insulation layer;
  A facing layer; and
  A vapour control membrane between the insulation layer and a facing layer.

The facing layer may comprise gypsum fibre board. The facing layer may comprise non-paper faced gypsum fibre board.

The insulation layer may comprise a closed cellular structural expanded foam that trap gas within the cells such that it is a barrier to heat transference and has increased thermal resistance.

The modular wall panel may comprise a backing layer and a vapour control layer between the backing layer and the insulation layer. The backing layer may comprise gypsum fibre board.

The modular wall panel may comprise first and second edges, wherein the first and second edges are configures to create a confused joint when joined together. For example, the first edge may comprise a male profile and the second edge may comprise a female profile.

The modular wall panel may comprise conduit for services, such as electrical wiring, cables or pipes within the insulation layer. The conduit has the advantage of both protecting the services and allowing them to be easily replaced.

The modular wall panel may comprise a heating and/or cooling system within the insulation layer. The heating and/or system may comprise pipework for the flow of hot or cold fluid. The heating and/or cooling system may comprise a protective cover plate. The protective cover plate may be thermally conductive. The protective cover plate may comprise a metallic material. The protective cover plate may support the pipework, for example by clips.

The wall panel comprises insulation material at the rear of the pipework. This insulation material may comprise the insulation layer or a further insulation layer. This has the advantage that the heat/coolness generated from the pipes is directed through the front of the wall panel and not lost through the rear of the wall panel.

The wall panel may comprise two opposite vertical edges and wherein each vertical edge may be provided with cooperating elements, which in use engage with a cooperating element on an adjacent wall panel to pull the two wall panels together. The cooperating elements may comprise a cam action to pull the two wall panels together. The cooperating elements may comprise the components of a cam lock.

An further aspect of the present invention provides a modular wall panel for a modular wall system, said modular wall panel comprising:
  an insulation layer;
  a facing layer; and
  wherein conduit, wiring and/or pipework for services are integrated into the panel.

The conduit, wiring and/or pipework may be integrated into the insulation layer.

The present invention reduces the heat loss resulting from the installation of services, as the services (electrical and mechanical) are encapsulated within the wall panels. In this way air paths introduced on installation of the services on-site have been eliminated or reduced.

A further aspect of the present invention provides a walling system for a building comprising:
  an external wall;
  an internal wall comprising modular wall panels;
  a sealed cavity between the external wall and internal wall.

The walling system may comprise a ventilation system:
  wherein the sealed cavity acts as an air plenum for the ventilation system.

The inlet and/or outlet of the ventilation may be through the one or more modular wall panels.

The walling system may comprise an air source into the sealed cavity. The air source may comprise a vent through the external wall. The air source may comprise an air source heat pump.

The walling system may comprise an air outlet from the sealed cavity, for example a filter fan. The air outlet may be through an external wall.

The air source and air outlet may be located on different sides of the building.

The sealed cavity may be subdivided into sections, with channels between them to allow limited air flow.

In an embodiment, the modular wall panels comprise laminate wall panels comprising a facing layer, insulation layer and backing layer and a vapour barrier layer between the insulation layer and one or both of the facing layer and backing layer. The facing layer may comprise gypsum fibre board, such as non-paper faced gypsum fibre board. The insulation layer may comprise a closed cellular structural expanded foam that traps gas within the cells such that it is a barrier to heat transference and has increased thermal resistance.

The modular wall panel may comprise a first vapour control layer between the backing layer and the insulation layer and a second vapour control layer between the facing layer and the insulation layer. The backing board may comprise gypsum fibre board.

In one embodiment, the walling system may comprise conduit for electrical wiring and/or pipework for a heating/cooling system within the modular wall panel.

The faces of the external and internal walls adjacent the sealed cavity may be provided with vapour control barriers.

The performance level of the system may be modeled such that it will provide the maximum performance while gaining acceptance of the relative building control requirements, optimising the efficiencies and providing a slimmer overall system. The inner leaf will have insulation at least as required by building regulations.

The present invention provides an inner leaf to a wall which is both structurally strong and de-coupled from the outer leaf. As the inner leaf is de-coupled from the outer leaf (i.e. not supported by the outer leaf), there are no thermal bridges between the inner and outer leaves and the thermal efficiency of the wall is thereby increased. In addition to an increase in thermal insulation, there is also an increase in sound insulation.

The inner leaf is a modular wall and uses a system of cooperating elements to pull adjacent wall panels together; this creates a structure which is sufficiently strong and rigid to be self-supporting. The combination of adjacent wall panels being pulled together and wall panels being pushed upwards against a structure above creates a very strong modular wall.

The wall of the present invention provides a very quick and effective system to install, that reduces onsite installation times by removing the requirement for the on-site construction of the inner leaf of the building, plastering and on site wiring, plumbing and insulating. It reduces the overall thickness of the walls of the building, which in turn increases the living area. Most importantly it reduces the energy requirement and decreases the amount of carbon dioxide that the building generates.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and figures). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

The present invention will now be further described with reference to the following non-limiting examples and the accompanying illustrative figures, of which:

FIGS. 1.1 and 1.2 are cross sectional plan views of a prior art walling system;

FIG. 1.3 is a cross sectional plan view of a wall system according to the present invention;

FIG. 2 is a perspective view of the wall panels of the present invention;

FIG. 3 shows an exploded view of the structure of the wall panels of the present invention;

Figure 5:
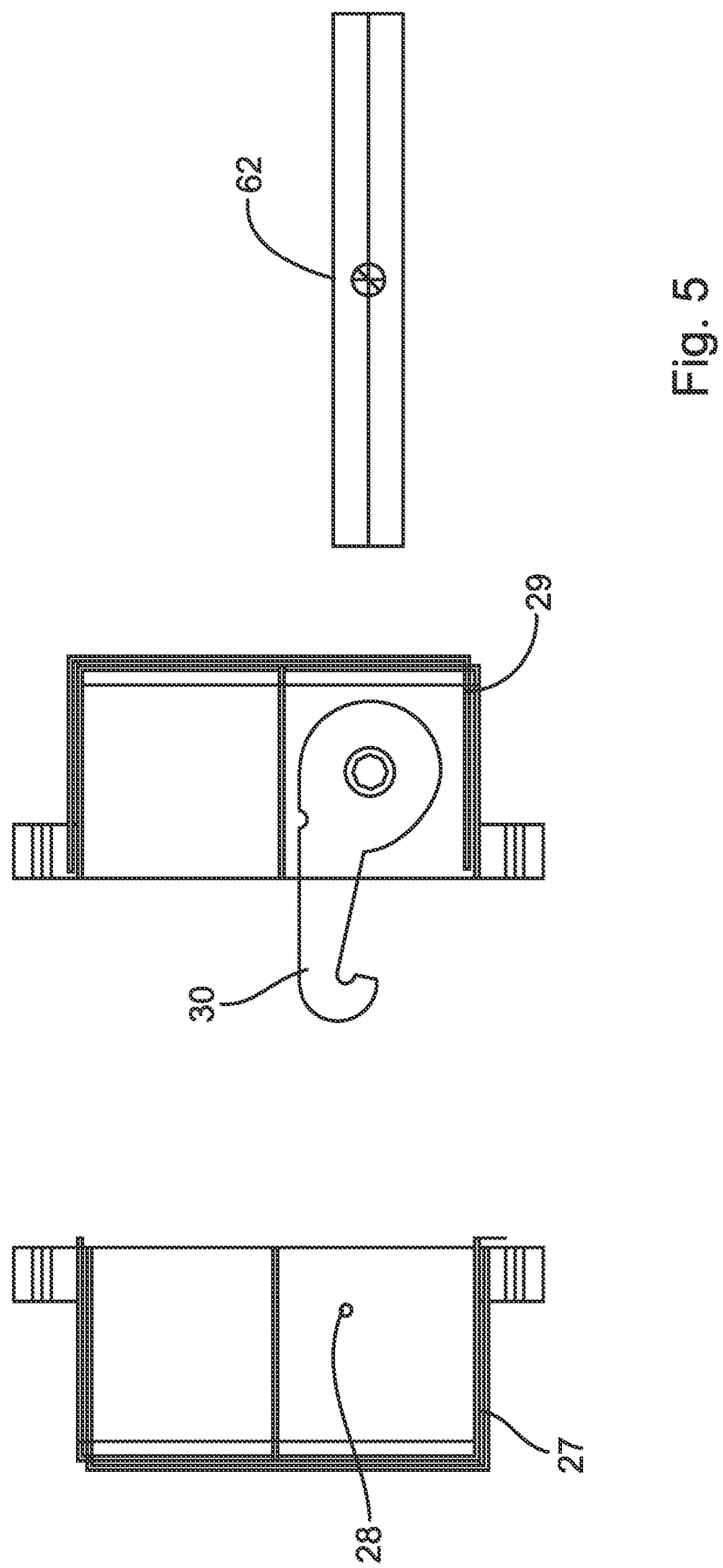
Figure 6:
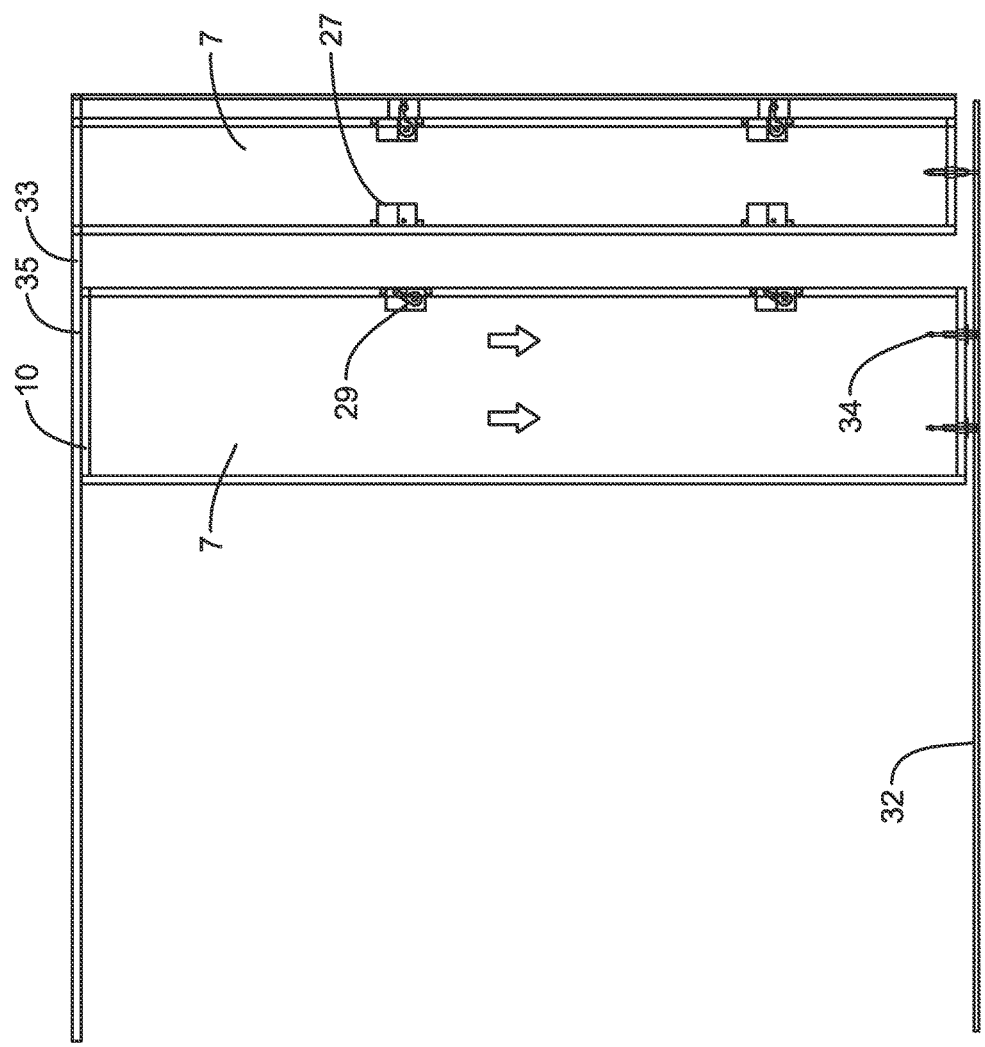
Figure 7:
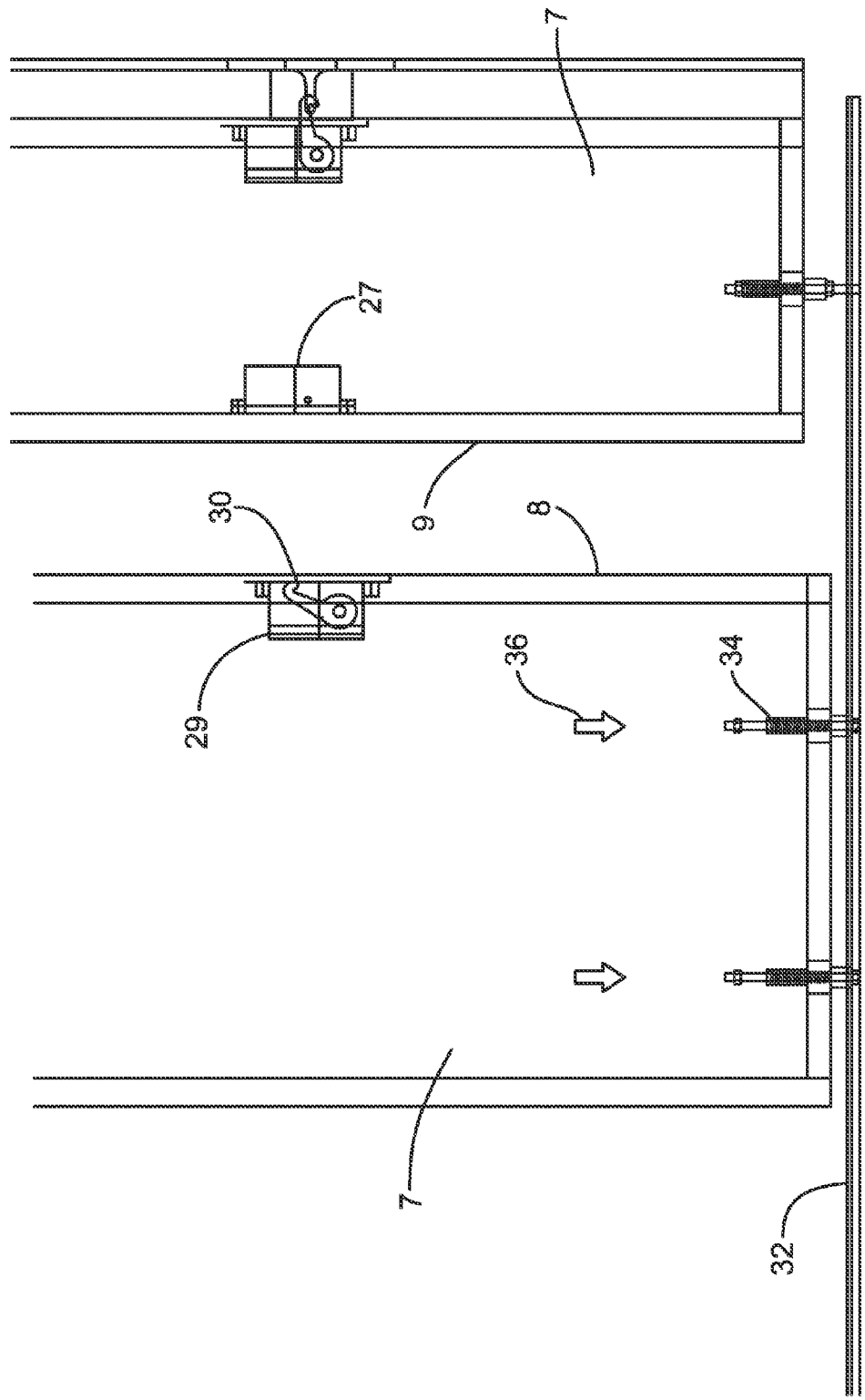
Figure 8:
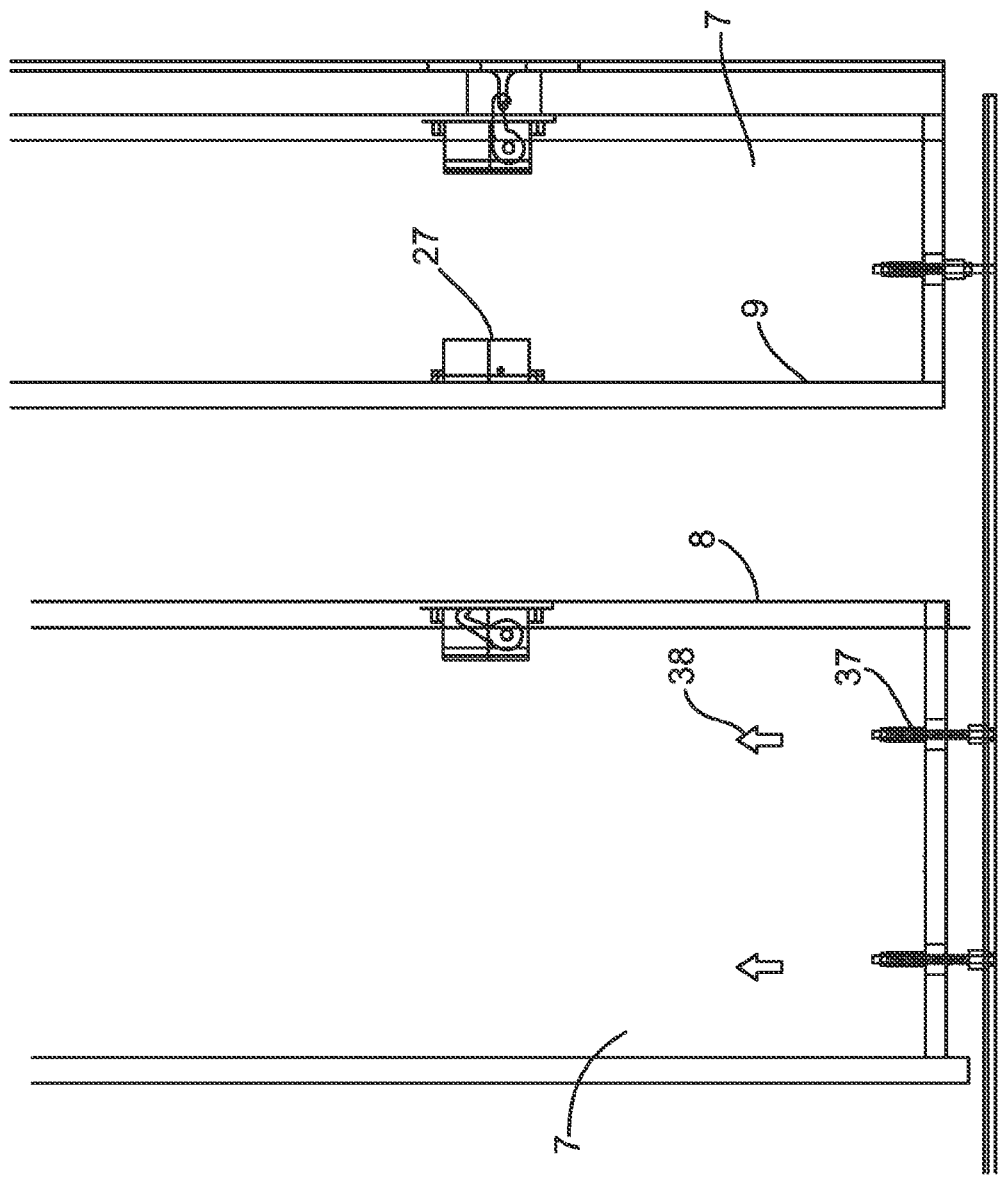
Figure 9:
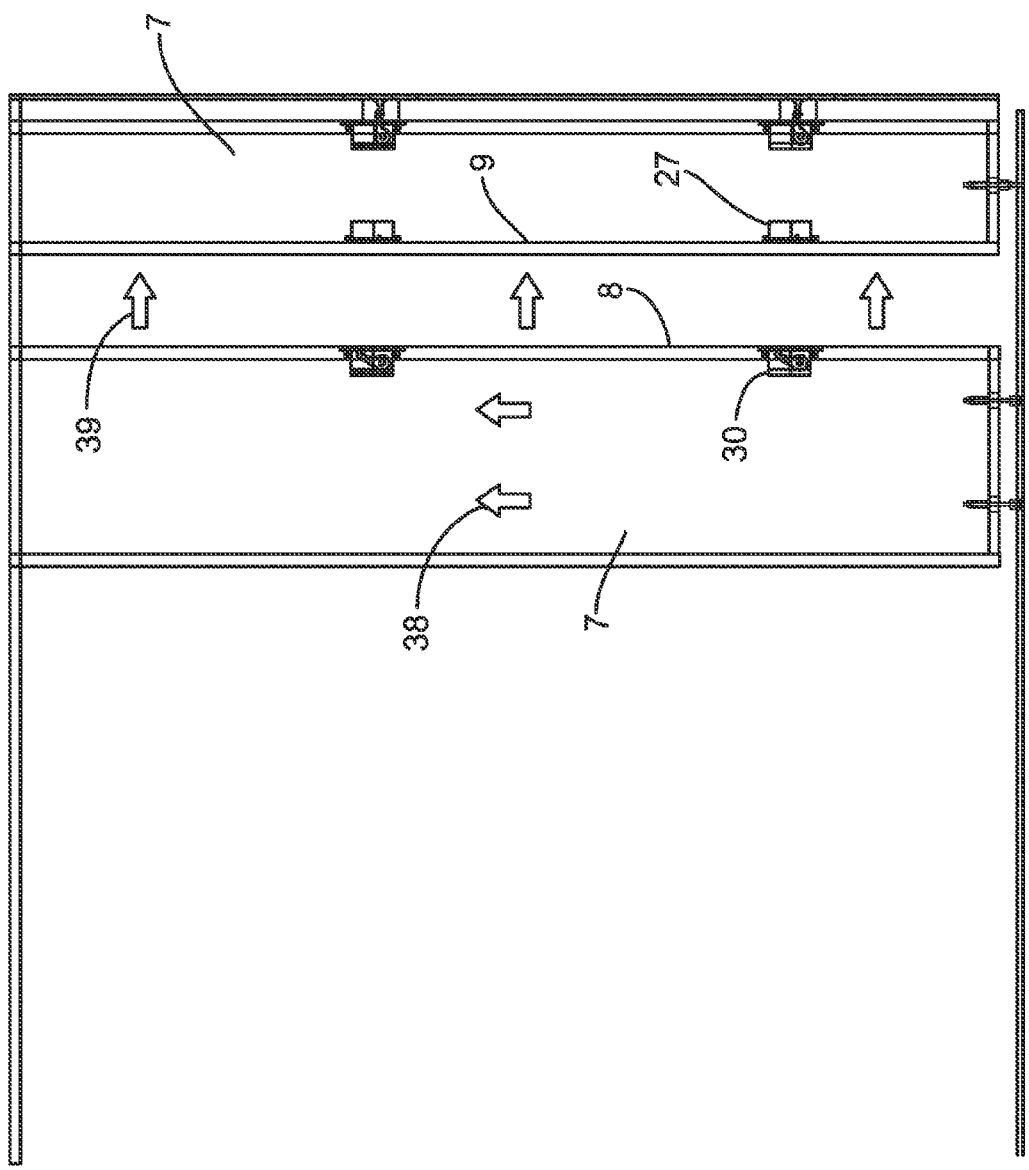
Figure 10:
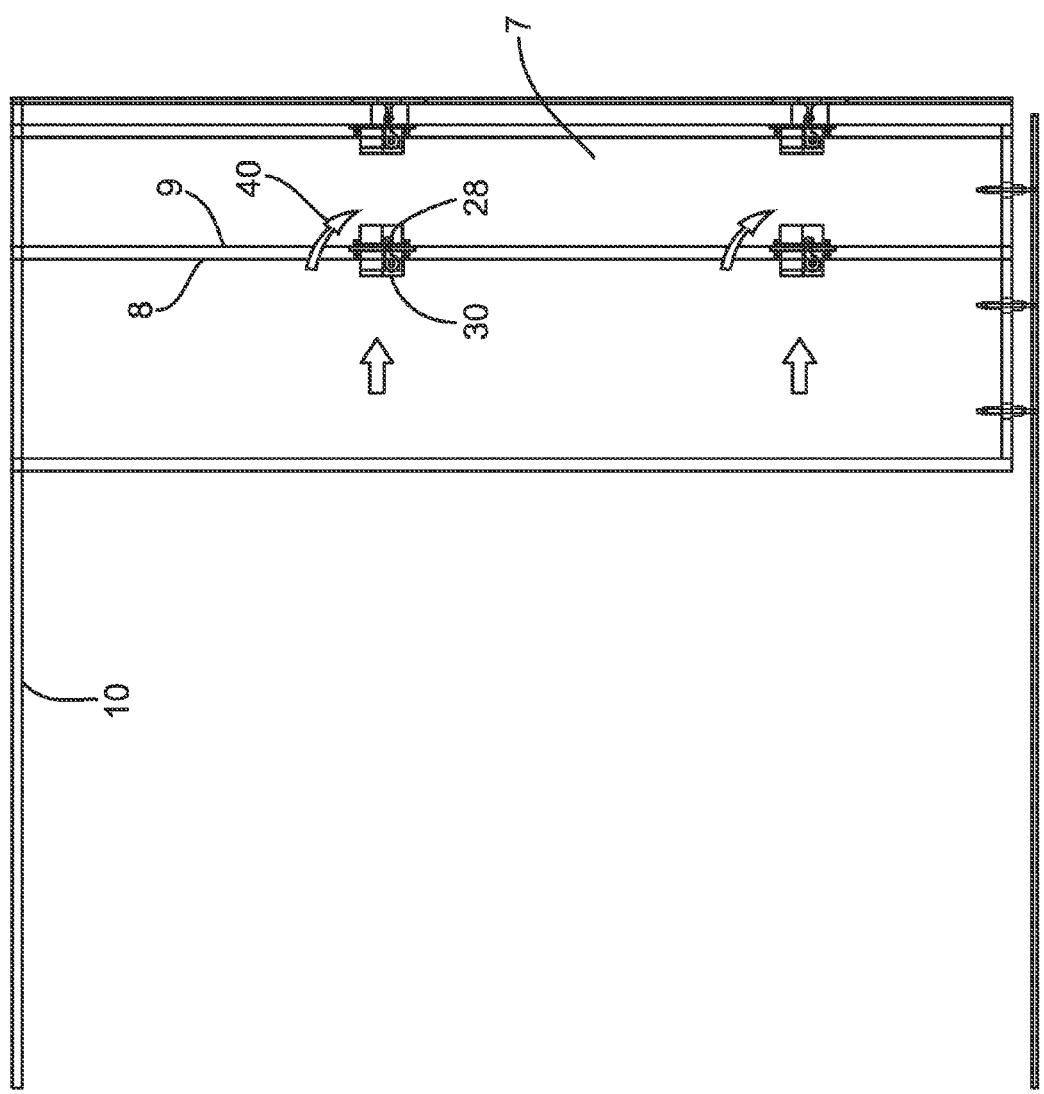
Figure 11:
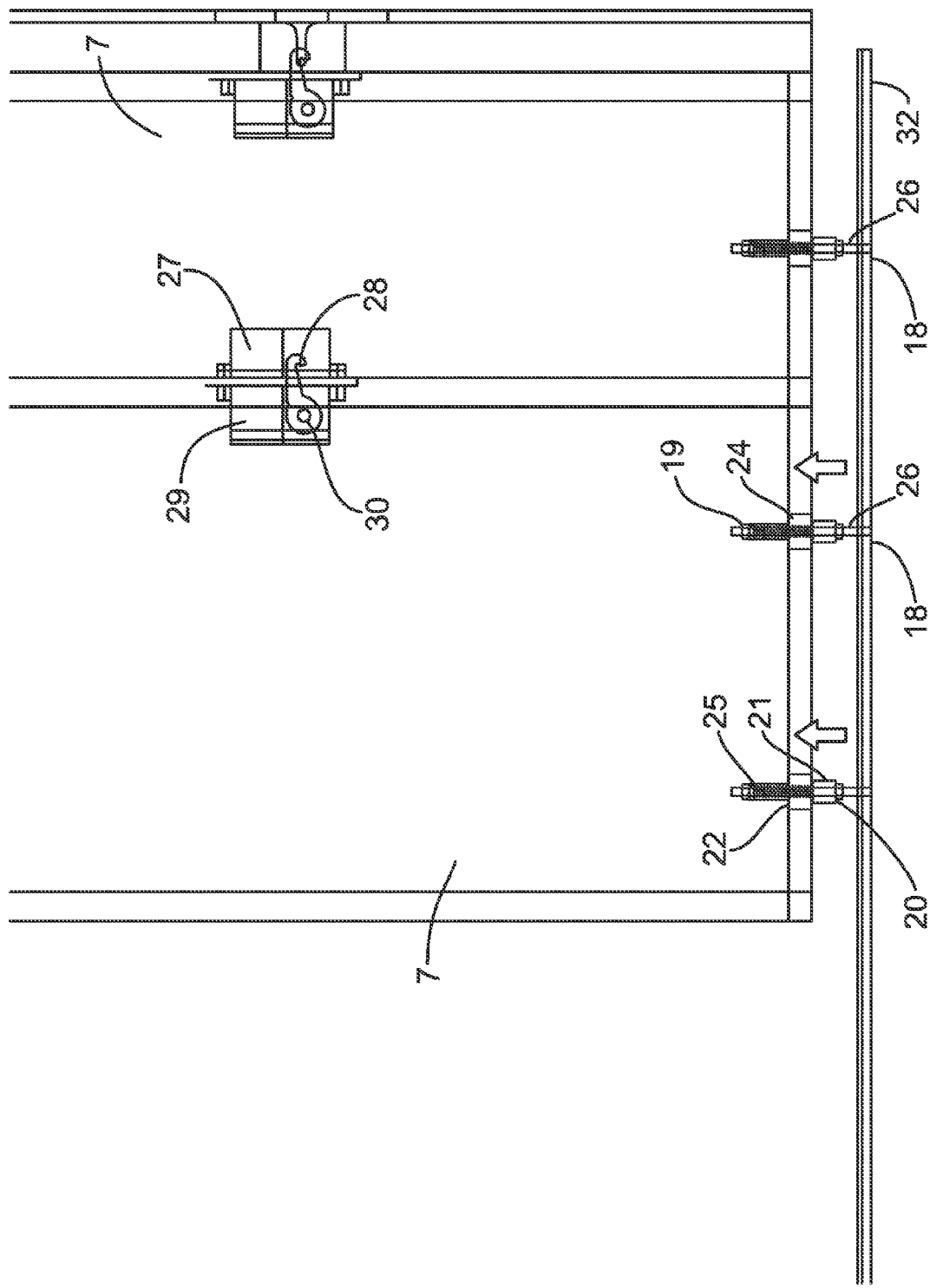
Figure 12:
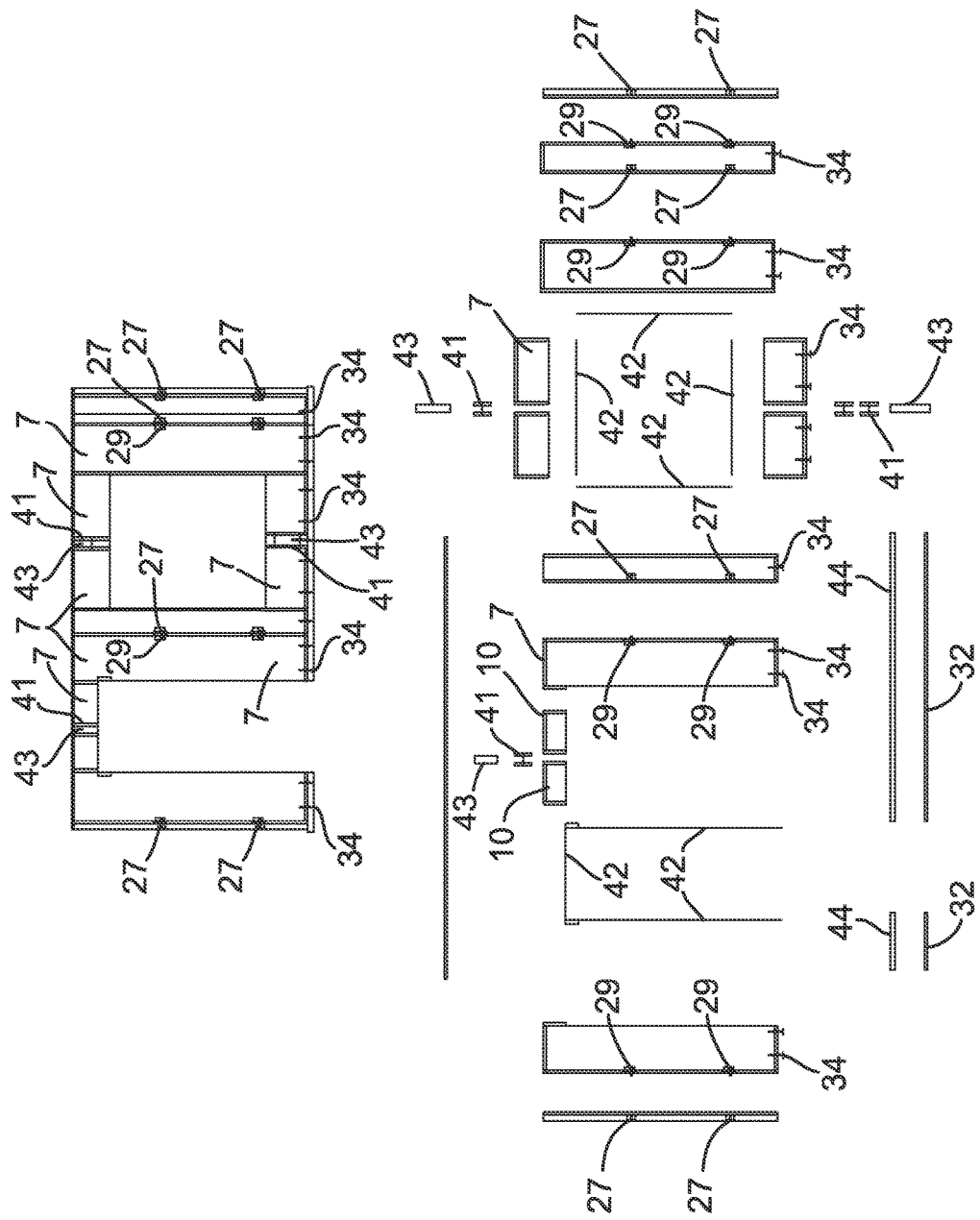
Figure 13:
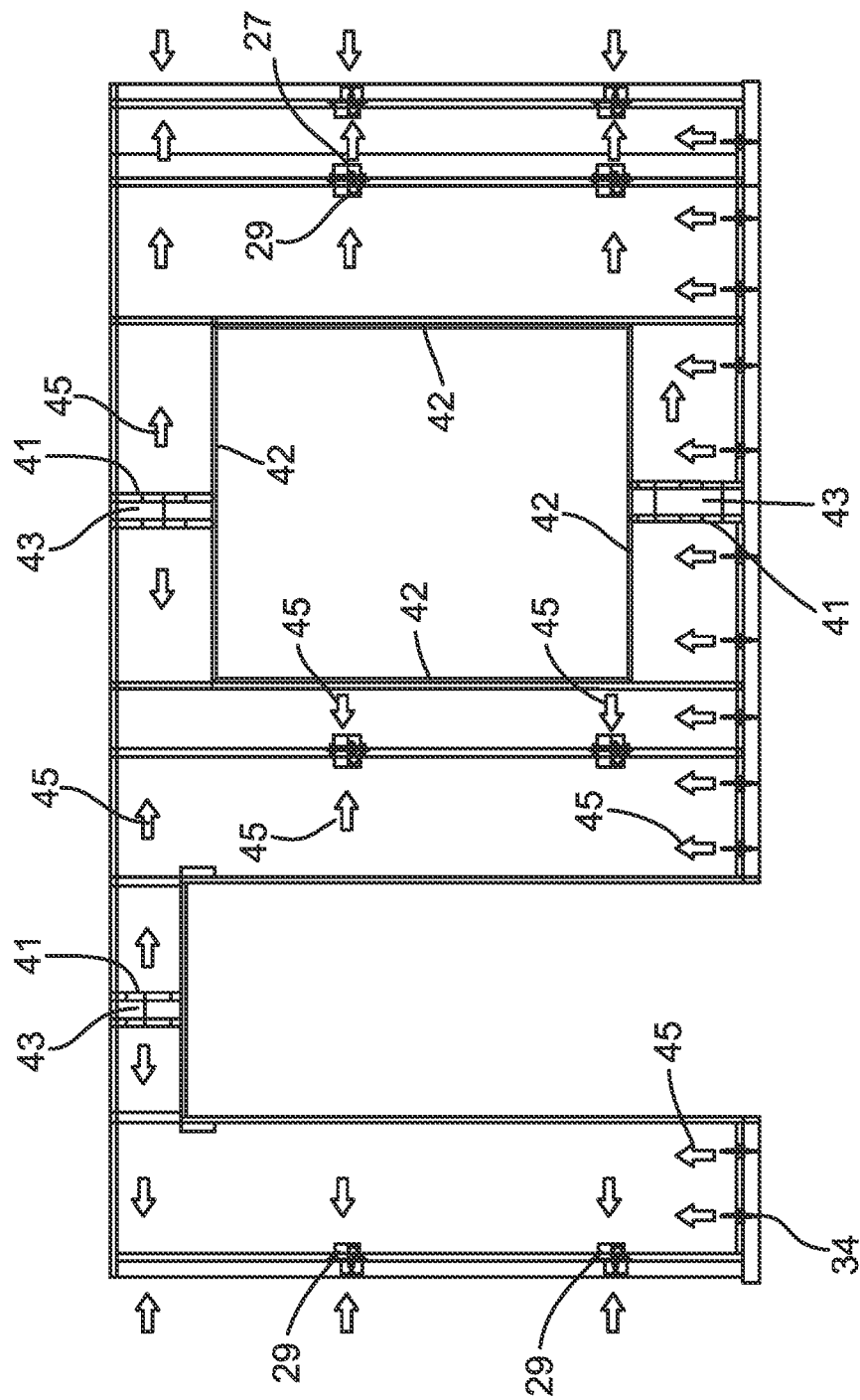
Figure 14:
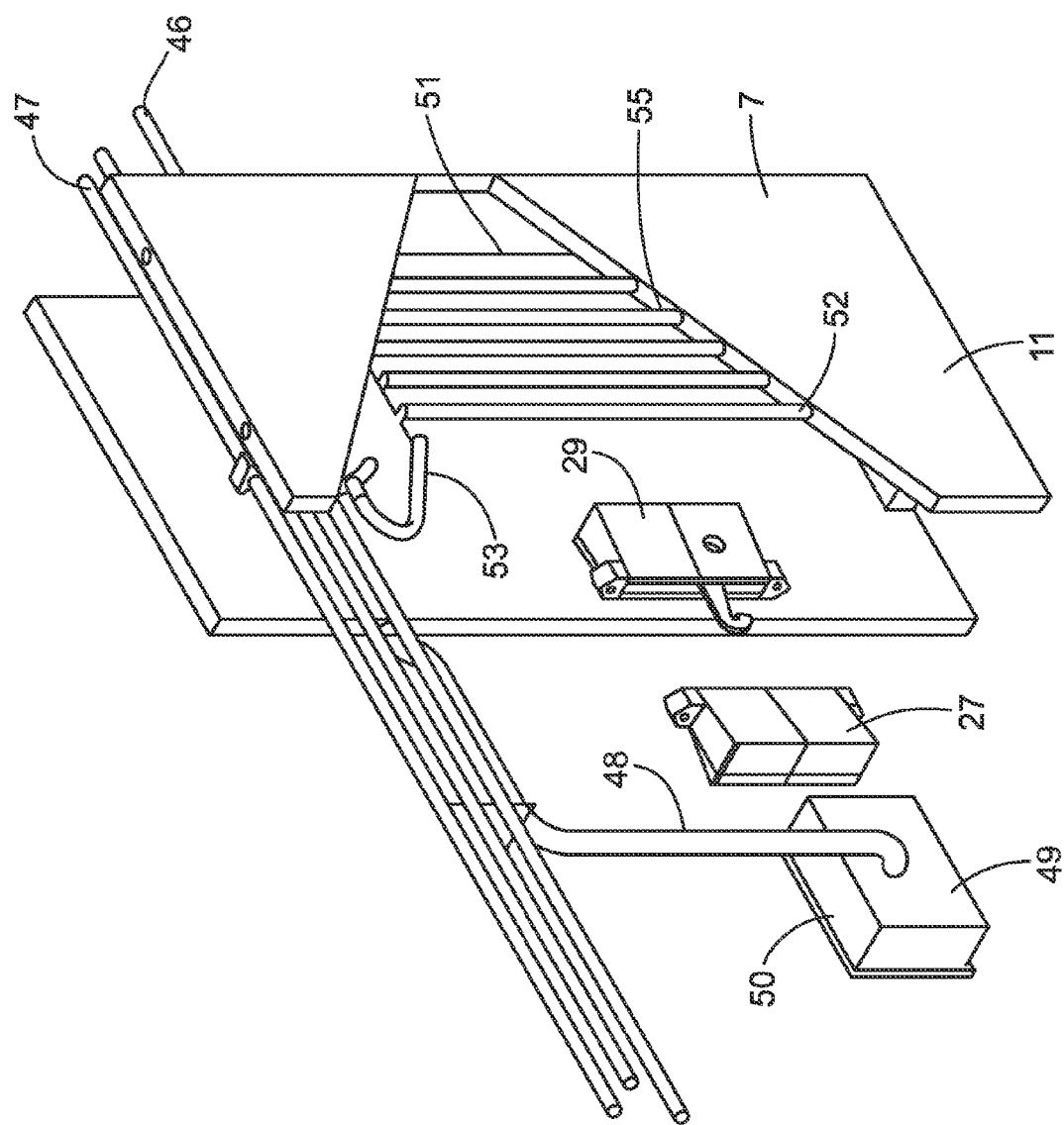
Figure 15:
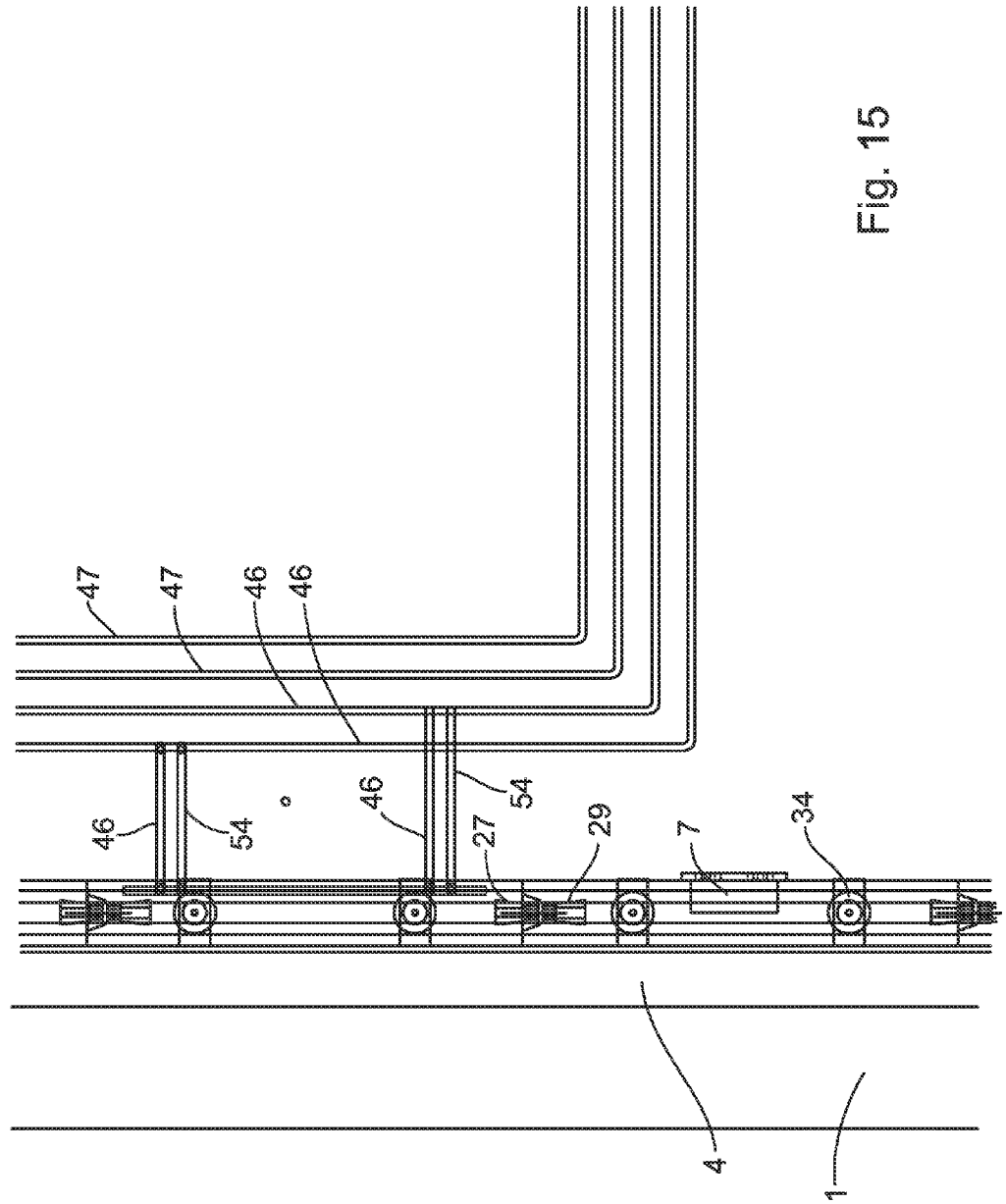
Figure 16:
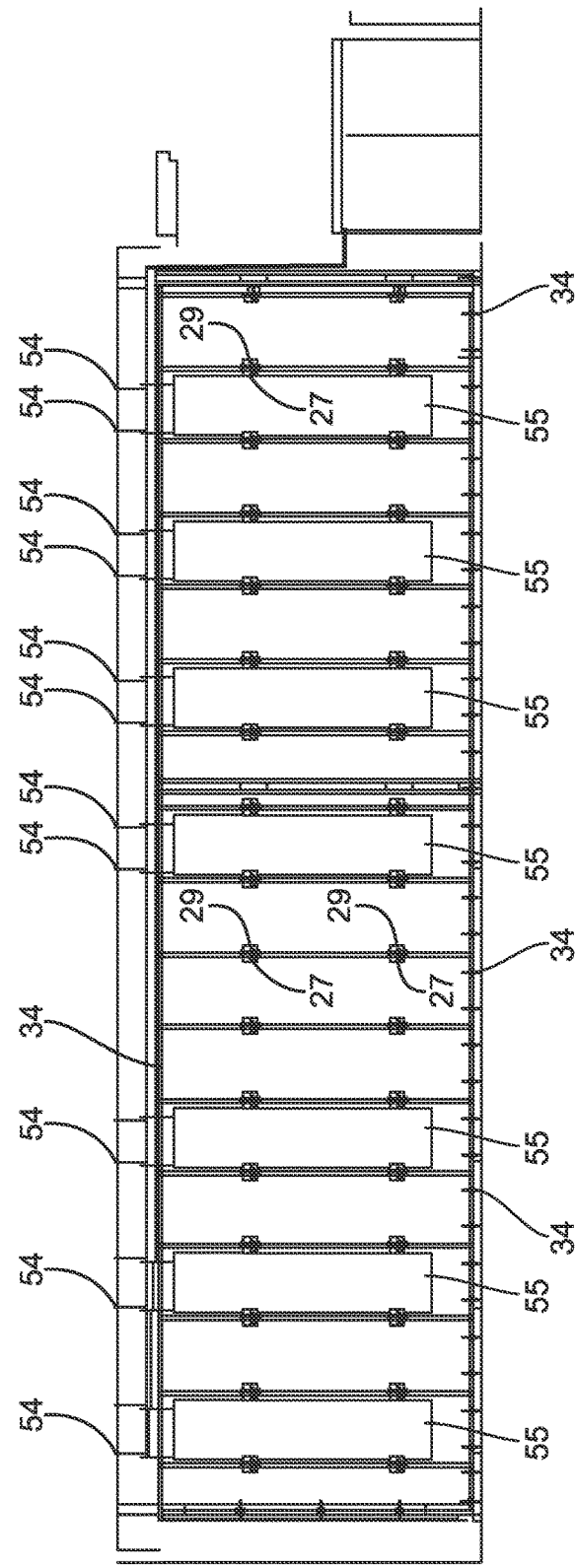
Figure 17:
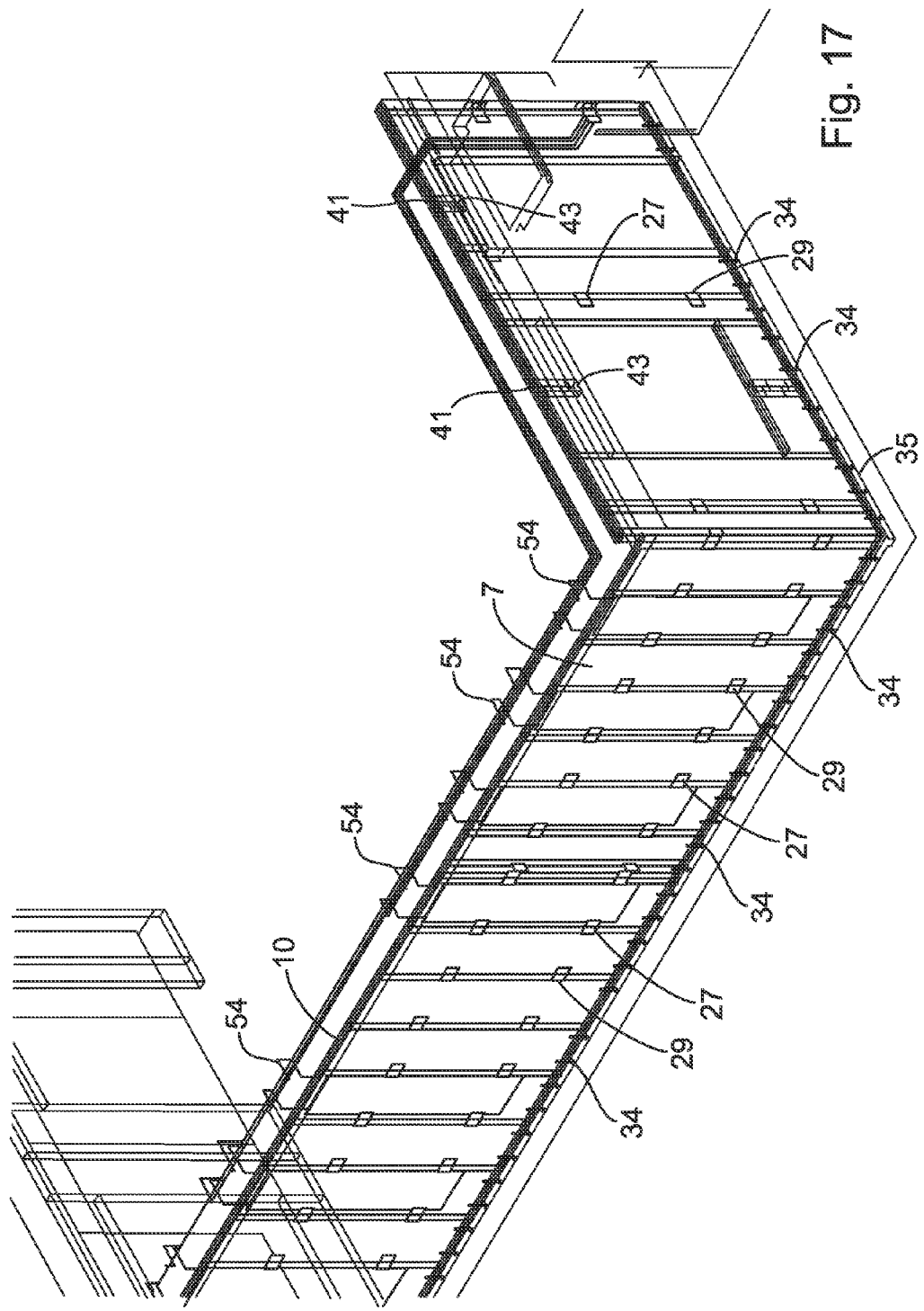
Figure 18:
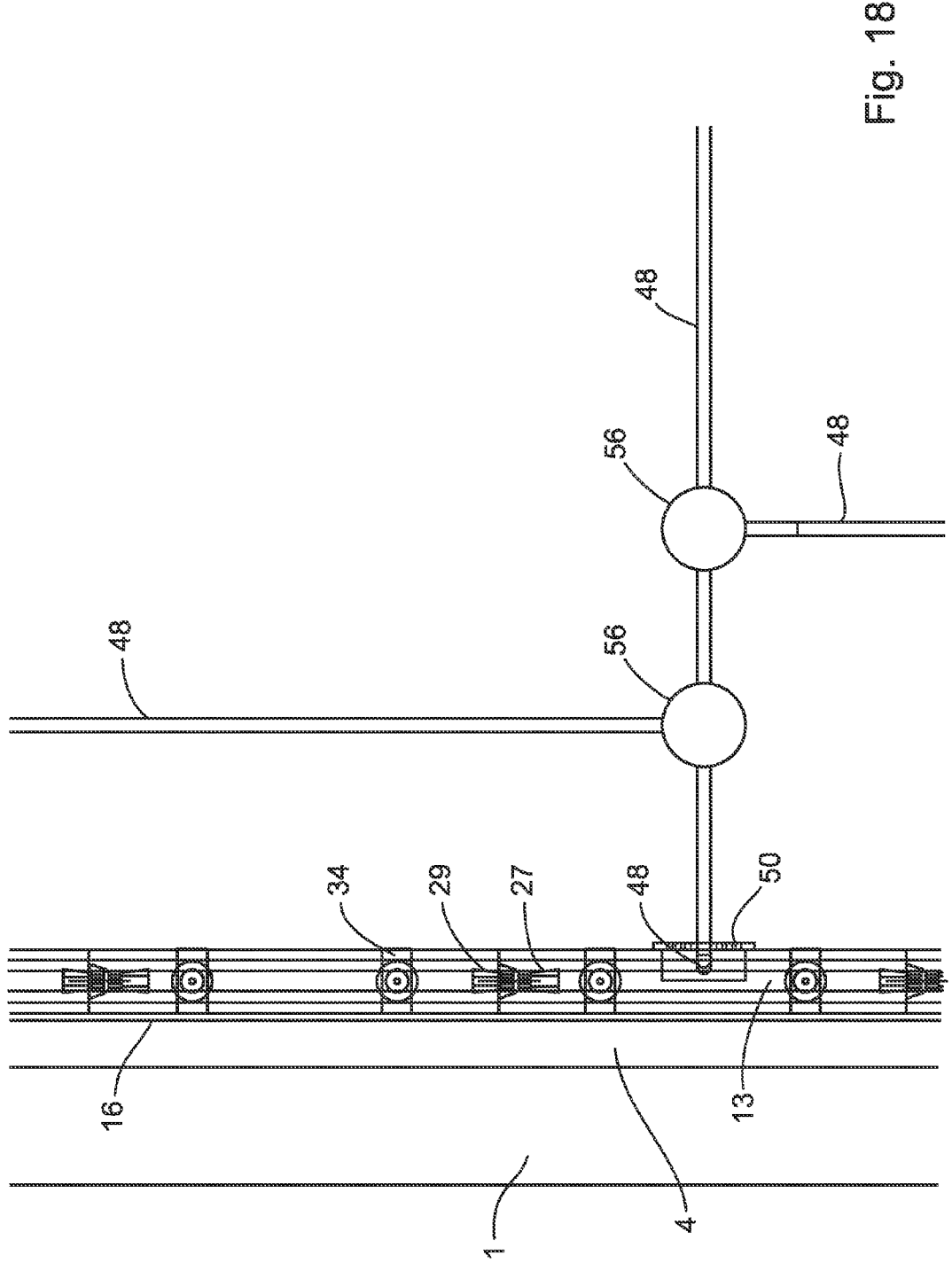
Figure 19:
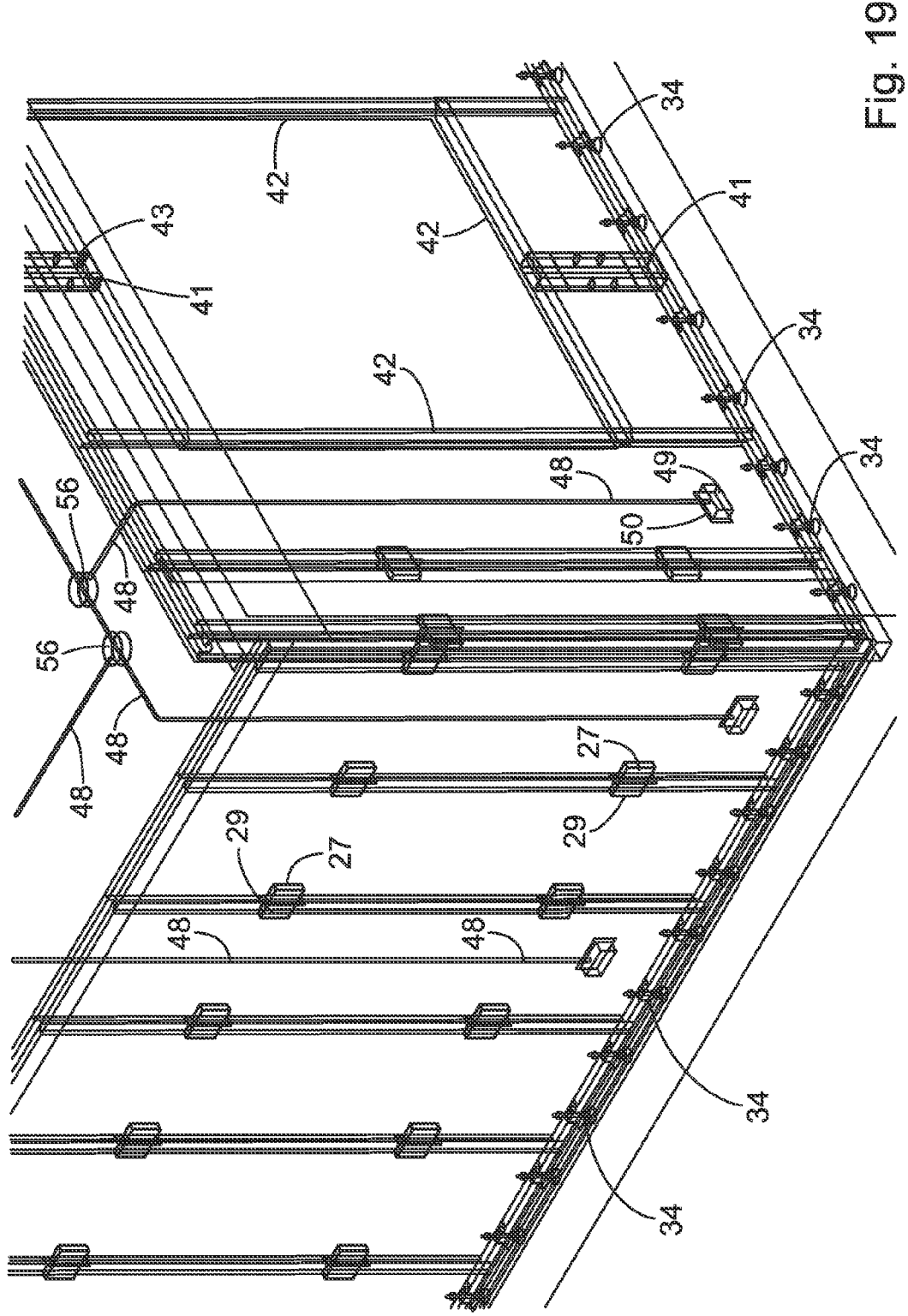
Figure 20:
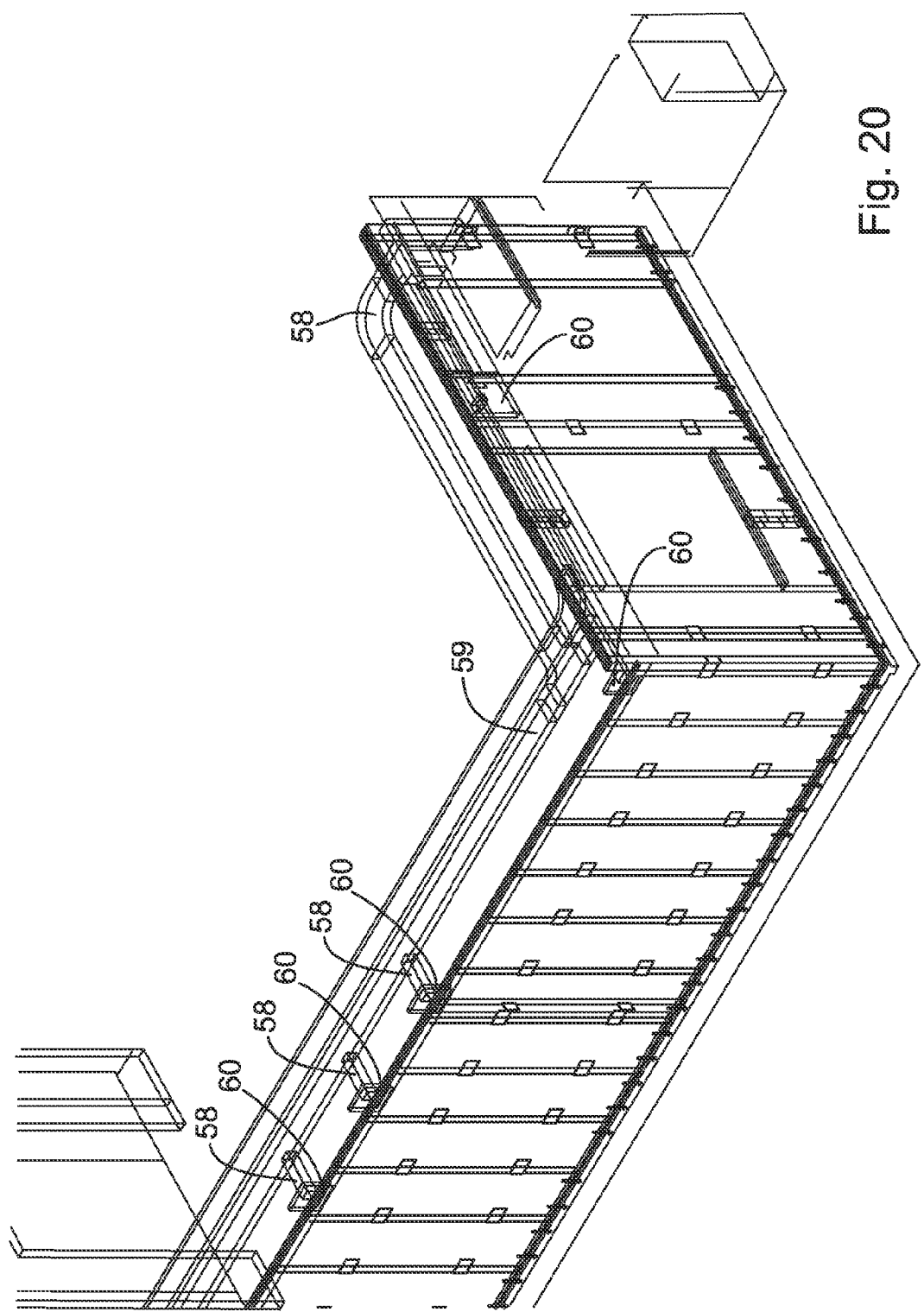
Figure 21:
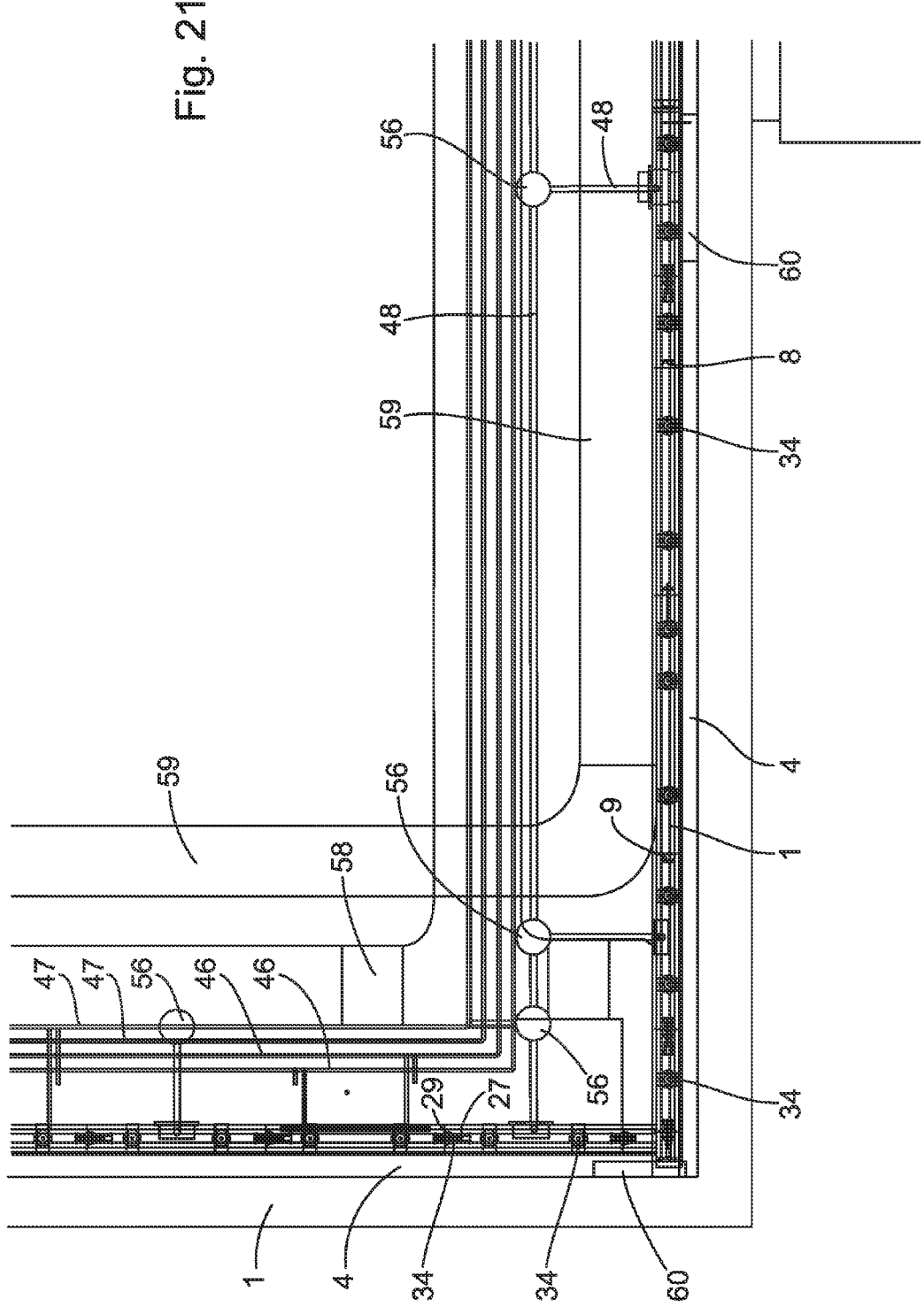
Figure 22:
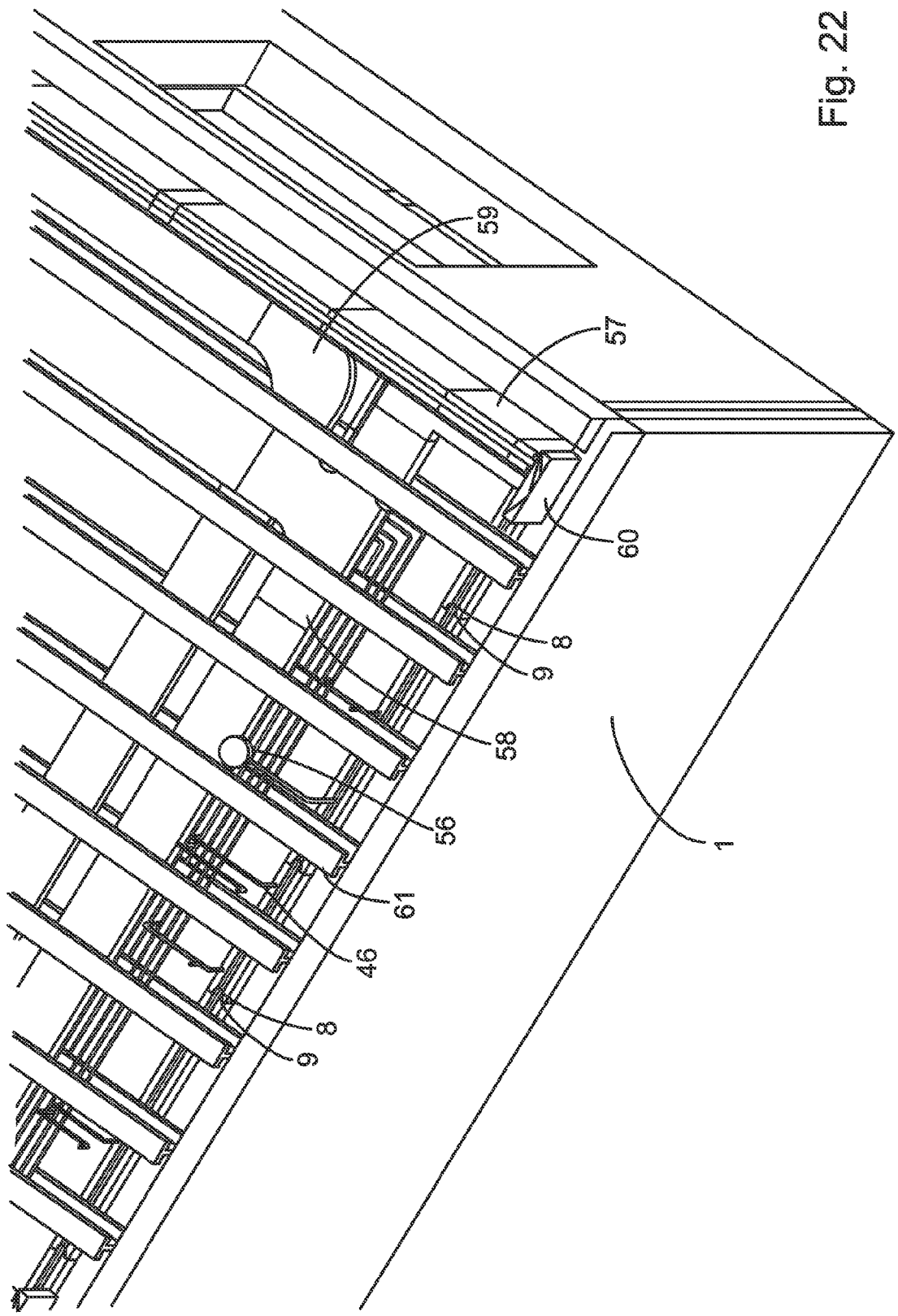
Figure 23:
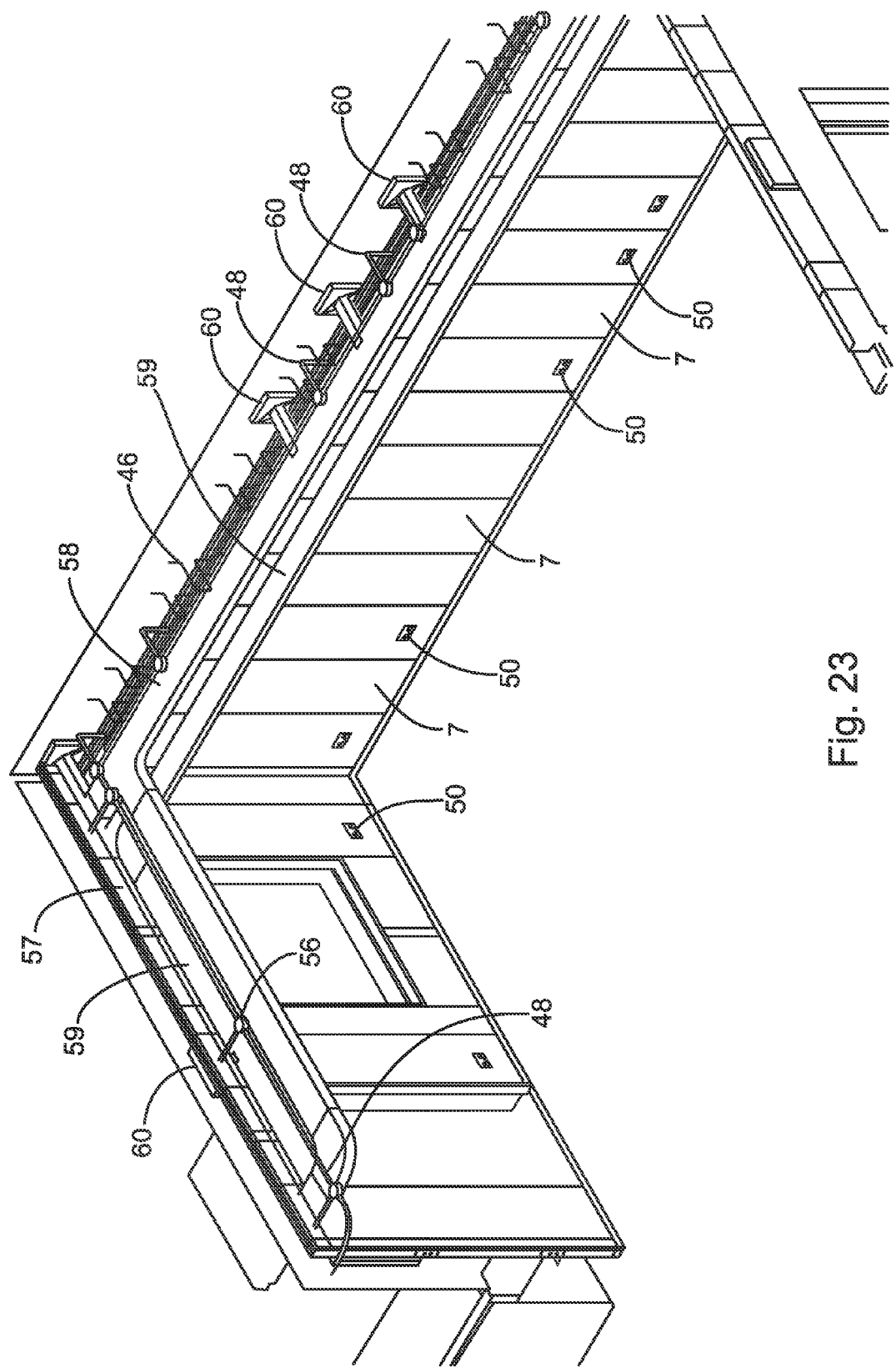

FIGS. 4.1 and 4.2 show a leg of the present invention in the adjustment position; FIG. 4.1 shows the spring extended and FIG. 4.2 shows the spring compressed; FIG. 4.3 shows the leg in the load bearing position;

FIG. 5 is a plan view in cross section of two adjacent panels showing the cam lock assembly;

FIG. 6 shows a front elevation of wall panels of the present invention fitted to a header track and base track;

FIG. 7 shows the bottom part of the assembly shown in FIG. 6;

FIG. 8 shows the same view as FIG. 7 but with the downwards load on the wall panel removed;

FIG. 9 is the same view as FIG. 6 but with the wall panel in its free state;

FIG. 10 is the same view as FIG. 9 but showing two panels coupled together;

FIG. 11 is a front elevation showing the base of a partially assembled modular wall;

FIG. 12 is a front elevation of a modular wall with a door and window opening;

FIG. 13 is the same elevation as FIG. 12, showing the forces applied to the panels;

FIG. 14 is an exploded view through part of a wall panel;

FIG. 15 is a plan view of the wall system of FIG. 14 with building pipework;

FIG. 16 is the side view of a typical building with the panels in place and shows the location of the camlocks and the location of the heater/chiller panels;

FIG. 17 is a perspective view of a typical building showing the total wet water systems;

FIG. 18 is a plan view of the wiring circuits;

FIG. 19 is a perspective view of a building showing the modular panels and wiring circuits;

FIG. 20 is a perspective view of the building showing the modular wall panels and an air supply system and the extract system;

FIG. 21 is a plan view of the modular wall panel showing the complete services;

FIG. 22 shows a perspective view of the cross section of a typical building;

FIG. 23 is an internal view of a building built using the method and system of the invention;

FIG. 24 is a perspective view of the first floor of a building, the upper floor cut away;

FIG. 25 is a perspective view of internal walls using modular panels; and

FIG. 26 is a perspective view of internal walls using modular panels

DETAILED DESCRIPTION

FIGS. 1.1 and 1.2 show cross sections of prior art walling systems and FIG. 1.3 shows a walling system of the present invention. FIG. 1.1 illustrates the current and traditional way that todays regulations state that a building should be built to achieve the best performances, both thermally and acoustically. It shows that there is an outer leaf 1 that basically stops the elements coming into the building while providing an element of resistance to thermal loss. A cavity 2 is filled with a form of insulation, generally some form of insulation fibre. In previous regulation this needed to be a minimal thickness of 100 mm (3.94 in). The walling system has an inner layer or inner leaf 3 of either brick or timber which encloses the cavity trapping in the air, so that it increases the resistance of thermal transfer from the warm inner room to the cold exterior (or vice-versa in warmer conditions).

FIG. 1.2 shows that the performance of the thermal conductivity of the walling system of FIG. 1.2 can be improved by increasing the thickness of the insulated cavity 2. Currently, the only way that this improvement can be achieved is by increasing the thickness of this insulated cavity.

FIG. 1.3 shows a cross section of the walling system of the present invention. The insulated cavity 2 and the inner leaf 3 of FIGS. 1.1 and 1.2 have been removed and replaced with a modular walling system. This has the advantages of reducing the area that the insulation encroaches into the room, whilst also improving the air tightness and acoustic performance.

In the present invention, the outer leaf 1 may be an inherited structure of an existing building or may be purpose built. The outer leaf may be any conventional or modern building material, for example masonry (e.g. brick or stone), wood, SIP (structural insulated panels) or insulated concrete formwork (ICF).

The insulated cavity 2 of the prior art has been replaced with a sealed cavity 4.

The inner leaf 3 has been replaced with modular walling system 5, which is described in more detail in FIGS. 2 and 3. The modular walling system 5 uses insulated wall panels, resulting in an improvement in the thickness of the higher value insulation at the point of the thermal bridge 6.

FIG. 2 shows how the walling system of the present invention is built up to provide the level of improvement over the prior art. The walling system is made up of laminated panels 7 with male and female joints 8,9 at the vertical edges. The male section 8 of the panel has been machined on to the panel edge and the female section 9 has been machined onto the opposite panel edge. The upper edge of the panel is provided with a rebate 10 to accept the header rail of the systems.

FIG. 3 shows construction of the wall panels which have a laminate structure. An inner facing layer11 is provided by a non-paper faced gypsum fibre board. This gives a very hard finish that increases the acoustic performance of the system. Non paper faced gypsum fibre board has the advantage of not requiring a plaster finish. In addition, the non paper faced gypsum fibre board reduces the risk of any propagation for any potential of fungal or mould growth and is very hard wearing.

A barrier for moisture is provided by a vapour control membrane 12 bonded between the facing layer 11 and the adjacent layer 13. This provided a barrier to stop warm air condensation formed within the room penetrating through the system.

An insulation layer 13 is provided adjacent vapour control membrane 12. The composition of the insulation layer 13 will vary depending on the requirement of the specification and the target reference numbers that the system will need to meet. However, suitable materials include polyisocyanurate (PIR). Other types of insulation that may be used subject to the performance criteria include PUR polyurethane and/or phenolic; each can be manufactured in varying densities and thickness from 12 mm (0.47 in) to 250 mm (9.84 in) to suit the performance levels, which may include thermal resistance, the way that each type of closed cell system reacts to certain levels of humidity, condensation and interstitial condensation, fire and acoustics.

A second moisture barrier is provided by vapour control layer 14, which acts as a barrier for the external temperature influence.

The laminate wall panel includes a backing layer 15, in this case a non-paper faced gypsum fibre board. In addition to the advantages described for facing part 11, the backing board 15 additionally acts as a balancer board. As the total system will be laminated under temperature, this backing board is required to keep the panel flat during cooling after the lamination process has been undertaken.

A final vapour control layer 16 is bonded to the panel adjacent the backing board. Once again, its main purpose is to stop vapour forming, in addition to forming the inner sealed area for the void area.

A final vapour control layer 17 is bonded on to the inherited structure. This serves three processes: it stops vapour ingress from outside, it provides a draft excluder for gaps within the inherited structure and it provides the outer layer of the sealed air gap, effectively sealing the cavity between the wall panel and the inherited structure. The vapour control layer 17 will be fitted across the floor, up the walls, onto the ceiling, round the corners of the adjoining wall and onto the window frames.

The male and female joints 8,9 at the vertical edges of the laminated panels creates a 'confused joint'. The confused joint prevents the join between adjacent wall panels providing a path for the transmission of sound, fire, heat etc. If the wall panel had straight edges, then sound, fire, heat etc could pass through the region of the join more easily than the middle of the panel. However, with the confused joint, the sound, fire, heat etc must still pass through a series of layers, even at the join.

FIG. 4 shows the legs of the wall panels of the present invention. FIGS. 4.1, 4.2 and 4.3 show three different stages of the legs.

FIG. 4.1 show a leg in its adjustment position. The leg has a base 18 provided by a circular plate washer; this is manufactured to tight tolerances so that it will fit snuggly in the base track (not shown) whilst still allowing the leg to move freely within the track. A rod 26 is fixed to the base plate 18. The rod is a high tensile threaded rod. Onto the rod is mounted a damper assembly comprises a hex nut 18, damper 21 and plate washer 22. In FIG. 4.1, the hex nut 19 is wound down to the base plate 18. The damper 21 is typically made form butyl rubber although alternative materials may be used. The damper has been engineered and manufactured to be able to deform under a governed compressive load calculated upon what the engineered load of the panel will be prior to the construction of the project. Plate washer 22 has been engineered to a given diameter. A compressive spring 23 is mounted on the rod 26 above the damper assembly. Using Hooks law, spring 23 has been calculated and manufactured to provide the correct compression due to the imposed load of the panel so that the panel will find equilibrium. A panel load bracket 24 is mounted on the rod 26, with the spring 23 passing through the same central aperture as the rod 26. The panel load bracket has a horizontal flange which in use supports the panel. The panel load bracket 24 has a sleeve 25 attached to its upper surface. The sleeve 25 encapsulates the spring so that the line of compression will not deviate away from vertical thrust. The top of the sleeve 25 has an aperture large enough to fit over the rod 26 but not sufficiently large for the spring 23 to fit through. The whole assembly is then capped off with a further hex nut 19. This complete assemble is then bonded within the panel; which is described in more detail with regard to FIGS. 6 to 11.

FIG. 4.2 shows the leg with all of the same components as FIG. 4.1 but with spring 23 compressed. Hex nuts 19 are in the same position as shown in FIG. 4.1 but the panel load bracket 24 has been pushed downwards compressing the spring 23. As stated, the spring has been calculated to provide a governed length at compression to a given load. The rest of the components of the leg assembly remain in place.

FIG. 4.3 shows the leg in the load bearing position. In this position the lower hex nut 19 has been adjusted to push the damper assembly and panel load bracket assembly upwards until they are in contact with the upper hex nut 19. The compression spring 23 is compressed and fully housed within the panel load bracket assembly and thus has been effectively moved out of the load bearing path. The load is now being transferred through the butyl damper rather than the compression spring.

This arrangement of the leg assembly overcomes the problem that whilst the spring has a large deflection which is useful during assembly of the wall panels, the durability of the spring over time cannot be guaranteed as the relatively high loads of the wall panels may cause fatigue. By contrast, whilst the damper does not have an equivalent range of deflection, it is much more durable over time under the load of the wall panels Adjacent wall panels are connected together by cooperating elements, such as cam locks. FIG. 5 shows a plan view in cross section of two adjacent panels. A male element 29 of a cam lock system is shown in a first wall panel and a female element 28 of the cam lock system is shown in the second wall panel. The female element 28 comprises a pin, whilst the male element 29 comprises a catchment bar 30 that is rotated using the key 62.

The catchment arm 30 has a taper on the lower section of the arm; when twisted, the angle of catchment arm 30 exerts a force that pulls the male and female elements together, effectively creating a tension force in the panel.

Adhesive is applied to the vertical edges of the panels before connection. The camlock pre-stresses the assembled wall panels whilst the adhesive sets and bonds them together. Expansion of the adhesive during curing would normally cause the panels to be pushed apart, however the camlock clamps the two panels together during this curing process. The expansion of the adhesive, whilst the panels are clamped together creates a horizontal compressive force in the assembled modular wall.

FIG. 6 is a front elevation of two assembled wall panels, showing how all of the components come together to provide the corner stone of the system.

Not only do the wall panels of the present invention provide an installation process that is quick and easy but the introduction of forces into the wall panel system increases the Young's modulus of the total system, providing a structural panel system with a very narrow footprint or thickness. This in turn allows the system to be free standing and therefore independent and de-coupled from the cold wall of the inherited structure.

FIG. 6 shows a header track 33 which is fixed to the existing structure but away from the cold face, for example it may be fixed to the ceiling, joists or rafters. In use the top edge of the panel connects to the header track, for example at the centre point of the panel. A base track 32 is fixed to the floor of the building, for connection to the leg assemblies of the wall panels. The use of a base track has two purposes. Firstly, the load of the paneling system is distributed over the extent of the track, allowing the load to be uniformly distributed. Secondly, this system allows the base part of the leg assembly to held in place by the track and allows the legs to run freely along the length of the track.

FIG. 6 shows the legs 34 in the adjustment position with the spring compressed. The length of the leg in this position is calculated to allow the wall panel assembly 7 to be installed, so that when the leg is inserted in the base track 32 and the spring is compressed, the panel fits under the header track 33. The arrows in FIG. 7 show the direction of the load exerted on the legs by the wall panels 7. FIG. 6 also shows male and female members 27,29 of the cam lock, which are clearly shown to be not level at this stage.

FIG. 7 shows in more detail the bottom part of the assembly shown in FIG. 6. This shows in clearer detail that the spring in the leg assembly 34 has been compressed in the direction of the force 36 exerted by the wall panel 7 being pushed downwards. FIG. 7 also shows adjacent male and female sections 8,9 of the paneling system becoming aligned and shows the male and female section 29,27 of the cam lock system reference numbers 29 and 27.

FIG. 8 is the same view of the panel assembly as FIG. 7 but with the load on panel 7 removed. With the applied force removed, the springs of the legs 37 push the panel up, locating the head rebate of the panel onto the header rail. At this point the panel will be in equilibrium and be held in place.

FIG. 9 is the same view as FIG. 6 but with panel 7 in its free state, aligned to the head rail and base track and with the cam lock aligned. The panel 7 can now be simply pushed to the other adjacent panel, where the male and female joints will be aligned allowing easy coupling of the system.

FIG. 10 is the same view as FIG. 9 but showing the two panels fully coupled. Male section 30 of the cam lock has locked on to locking pin 28 and in so doing a tension force has been imposed on the panel.

FIG. 11 is a front elevation showing the base of a partially assembled modular wall. In this figure, both panels are fully aligned and locked together. The compression spring is now moved out of the way, so that the load will be on a controllable structure. This is accomplished by winding up the bottom hex nut 19 until the damper assembly contacts the panel load bracket 24. In this load bearing state, the plate 22 encloses the bottom of the panel load bracket 24, with the compressed spring 23 fully housed within panel load bracket 24 (including sleeve 25). Plate 22 now acts as the bearer plate for the load from the panel load bracket 24 and spreads the load onto the damper 21. In this load bearing position, if there is any differential between the inherited structure and the modular walling, this deformation will be taken up within the damper. The damper has been manufactured for a deformation to occur under a designed load that does not exceed the modelled load.

FIG. 12 shows a front elevation and exploded view of a further embodiment of the invention. The system has been designed to take up the difference between tolerances on site and the manufacturing process. It is very difficult to construct a building where the site conditions and building process allow creep in the measured dimensions, introducing lower tolerances than used in the off-site manufacturing process. The on-site tolerances can differ from the off-site manufacturing tolerances by as much as +/−25 mm (0.98 in). In order to build an offsite paneling system to suit this amount of tolerance, either each element of the works would need to minutely dimensioned or the system must be trimmed on site. Both of these solutions would negate the advantages of the offsite build process. This embodiment uses an alternative solution to overcome this problem, as described below.

The present invention makes us of spreader brackets to adjust the position of the modular wall panels on-site and thereby the positions of any window or doorway openings. This solution has the additional advantage of improving the strength introduced into the panel. The spreader brackets apply a compression force on adjacent panels, which changes the direction of the forces within the panel. As is the case with all of the joints within the modular wall, the cam lock system and the compression systems created by use of the legs and these spreader brackets pre-stress the wall panels before the adhesive between adjacent wall panels bonds; the clamping load from the spreader bracket, which produces a compressive stress, balances the tensile stress created by the cam locks.

FIG. 12 shows a typical elevation found on-site which includes several wall panels defining openings for windows and doorways. The wall panels for the modular structure are manufactured off-site, for which both the dimensions of the opening (height and width) and its position are required. Whilst the height and width of the opening can be easily measured with a good degree of accuracy, the positioning of the opening within the modular structure is more difficult. This is due to the site conditions and building process increasing the error margin of the position of the window.

FIG. 12 shows the different elements required to allow the panelised system to be fitted with no cutting of the panels.

FIG. 12 shows the header and base tracks 33,32 into which are fitted multiple wall panels locked together using the male and female sections of the cam locks 27 and 29. A doorway opening is defined by adjacent wall panels with shorter wall panels above the opening. A spread bracket 41 has been introduced between adjoining panels above the door openings and above and below the window openings. This bracket thrust the adjoining panels apart, taking up tolerances within either the door or the windows. This bracket is then covered with an insulated cover strip 43. The lower section of the figure shows the complete elements required for the modular system. This includes the window and door reveal strips 42 and the base cover strips 44 used to insulate the exposed part of the legs.

FIG. 13 is the same elevation as FIG. 12 and shows that once all of the components have been assembled (including the spreader brackets), the building tolerances have been converted to the higher accuracy engineering tolerances. The system has a completely different tensile dynamic from a similar modular wall without the spreader brackets. As shown by the arrows in FIG. 13, the panel elements are now under a tensile force and a compressive force. The panels are in both compression and tension. By pre-stressing the panels via the cam locks before bonding the joints between adjacent panels, the compression is balancing the tension. In this way the forces are both equal and opposite, which by association increases the yield strength of the total structure.

The introduction of the spreader bracket 41 changes the direction of the forces and takes up any of the building tolerances. The combination of tensile and compressive forces within the panels allows the system to store within is structure a lot of effectively pent up energy that both hold the structure together. The rigidity and strength created by these forces allows the assembled modular wall to be structural and self-supporting.

FIG. 14 is an exploded view though part of a wall panel. The system will be build off site. The system must be air tight and one of the most pressing problems within the construction process of any project is provision of services to the resulting building. Current build techniques generally install these services to run within the inner leaf of the building, with the disadvantage that the thickness of the inner leaf of the building has been reduced to accommodate these services. Therefore the effectiveness of the total building envelope has been reduced by the introduction of the services. In addition, during the construction phase of the build, the quality of the construction is dependent on the skill of the builder; installation of services runs the risk of the inner leaf being broken and allowing air passage through it, thereby making the building less air tight and thus less thermally and acoustically efficient. To mitigate this risk, each panel has been developed to suit both its location and any services which will be required to sit within/on the panel (if any). Once this has been modelled, these services will be embedded within the panel as part of the build-up of the panel.

FIG. 14 shows how these services will be embedded within the panel. The panel 7 has a cut away section in the insulation layer to house the cam lock system (29 and 27).

The system also allows for an electrical wiring system within the panel. Protective wiring conduits 48 are provided within recesses in the insulation layer. These allow the wiring system to be cabled after the installation of the panel has been completed. This conduit system is terminated at the socket outlet plate 50 and the face plate back box 49. The panel system also incorporates a heating and cooling system for heating and cooling the room defined by the modular wall. The inner face of the gypsum layer 11 is rebated to accept the pipework reinforced high tensile cover plate 51. The pipework reinforced high tensile cover sheet is bonded to the gypsum layer so that this cover sheet spreads the heat evenly across the gypsum layer. The mass of the gypsum works in synergy with the high thermal conductance of the steel cover sheet, making the gypsum the layer that radiates the heat. The insulation layer stops the heat travelling out from the rear of the wall panel, ensuring that the heat path is directed only through the gypsum. The small diameter pipework 53 is pressed into this cover plate and held in place by clips. Using this steel plate to protect the pipework from any potential damage gives the additional benefit of providing a controlled disbursement of heat, as the steel plate and work in synergy. This, in combination with the high level of insulation provides an integrated system that is extremely effective with only two degrees of heat loss and six hundred watts of output.

In order to compensate for the expansion of the pipework and the cover plate, a kicker is provided. This changes the direction of the pipework from vertical to horizontal, allowing the pipework to freely expand through tthe thickness of the wall panel whilst protecting the front face of the wall.

Once the electrical and water services have been mounted within the panel elements, the whole system is bonded together to form the laminated panel. In this way all pipework and electrical systems are insulated and air tight within a governed and quality controlled factory environment that will enable modelling of the performance very accurately and achieve the desired outputs for the building.

As the services are bonded integrally to the modular wall, this both increases the insulation around any penetrations through the wall panels but more importantly increases the air tightness of the overall system.

FIG. 15 is a plan view of the wall system of FIG. 14 with building pipework. FIG. 15 shows services have been integrated with the paneling system; once the panels are assembled on site it is a simple matter of connecting up all of the services. This figure shows a plan view of the wet water system, showing the hot water systems 46 connecting to the heater panel 55. This figure also shows the outer leaf of the building 1, the sealed cavity 4, the leg assembly 34, the panels 7 and the cam lock assembly 29 and 27.

A chilled water ring may also be incorporated into the panel but is not shown. This works in the same way as the heating circuit.

FIG. 16 is the side view of a typical building with the panels in place and shows the location of the camlocks 29 27 and the location of the heater/chiller panels 55. The heater and chiller panels are in tandem to balance and maintain the desired living temperature within the house, irrespective of the outside temperatures or the effects of solar gain on the building.

FIG. 17 is a perspective view of a typical building showing the total wet water systems. FIG. 17 shows the panels being fed from above but they can quite easily be fed from below, for example both the lower and upper floors may be fed off from the same circuit (i.e. the mains ring).

FIG. 18 is a plan view of the wiring circuits. The wiring circuits are integrated within the panel at manufacture and connected up on site.

FIG. 19 is a perspective view of a building showing the modular panels and wiring circuits. FIG. 19 shows electrical conduits within each panel extending from an electrical switch in the panel to the top of the panel.

FIG. 20 is a perspective view of the building showing the modular wall panels and an air supply system 59 and the extract system 58. To maintain the correct living conditions, there must be a sufficient supply of clear air circulating around the building. As the current invention greatly reduces heated air loss through the building fabric, ventilation is required. As part of the modelling process prior to construction of the building, the correct number of changes of air within the structure required to make living in this building comfortable is modelled. Traditionally it has been very difficult to distribute this air around the building; convention methods include cutting ceiling and floor vents into the construction to provide access for the ductwork required to service the outlets.

The present invention uses the sealed cavity created by the de-coupled walling system and compartmenting areas off so that we can use this void as the duct work distribution system or plenum. FIG. 20 shows the front of the building being used for the supply air and the side walls the extraction. In this way the total building will have a managed amount of air changes to suit both the ambient conditions and the moisture content of the living conditions. This can be achieved by either increasing or decreasing the flow and extraction rates of air. This of course could not be achieved without the use of the sealed air gap of the decoupled system.

FIG. 21 is a plan view of the modular wall panel showing the complete services. This system of the present invention enables the construction techniques and the way that the building is built to be strictly managed and governed to a disciplined route map, so that the level of construction will be to a very high standard, as it is not be dependent on any inaccuracy that can be introduced by human error.

FIG. 22 shows a perspective view of the cross section of a typical building. It shows the outer leaf of the building 1, the sealed cavity 2 and the extract ductwork box 60 entering the sealed air gap. In addition, this figure shows that the front elevation panels 57 have been extended upwards past the floor joist, eliminating any potential for thermal bridging between floors.

FIG. 22 also shows the reveal boards in place around the window 42 and electrical access box 56 to allow the cable to be cabled easily as well as giving access to allow cable to be installed at a later date.

FIG. 23 is an internal view of a building built using the method and system of the invention. It shows all of the components required as part of the build process which in turn will prove a very thermally efficient system.

FIG. 24 is a perspective view of the first floor of a building, the upper floor cut away. It shows clearly that the front panels have been extended passed the floor joist to show the limitation of the risk for thermal bridging.

FIG. 25 is a perspective view of internal walls using modular panels. It shows that by using the same techniques and components as the external walls previously described, internal living space divisional walls can be developed. Camlock assemblies 29 and 27 are shown used in conjunction with spreader brackets reference number 41.

FIG. 26 is a perspective view of internal walls using modular panels. It shows the effect of the cam lock assemblies 29 and 27 when working either in conjunction or opposing both support the structure while trying to force the structure apart. In this way an outside force that exerts an influence on the structure will have an equal and opposite force transmitted to another part of the structure by using these combinations of forces. This structure will be self-supporting and geodetic.

The invention claimed is:

1. A modular wall panel comprising:
a wall panel, comprising first and second vertical edges, a top edge and a bottom edge;
a leg assembly connected to the wall panel and configured to apply a vertical force to the wall panel, the leg assembly comprising a spring and a damper assembly, wherein the leg assembly has an adjustment position in which the wall panel is spaced from the damper assembly and the vertical force is applied to the wall panel by the spring acting between the wall panel and the damper assembly, and a load bearing position in which the wall panel is in contact with the damper assembly and the vertical force is applied to the wall panel by the damper assembly, such that no vertical force is applied to the wall panel by the spring, and wherein a spring force of the damper assembly is larger than a spring force of the spring.

2. The modular wall panel according to claim 1, wherein a vertical groove is provided on a front face of one of the first and second vertical edges of the wall panel, to allow space for at least one of adhesive and filler.

3. The modular wall panel according to claim 1, wherein the first and second vertical edges are shaped to form a male-female connection between adjacent wall panels; wherein each vertical edge is provided with cooperating elements, which in use engage with a cooperating element on an adjacent wall panel to pull the two wall panels together.

4. The modular wall panel according to claim 3, wherein the cooperating elements comprise a cam action to pull the two wall panels together.

5. The modular wall panel according to claim 1, wherein the leg assembly further comprises a base;
wherein in the adjustment position, a load path from the wall panel to a floor is through the spring, damper assembly and base; and
wherein in the load bearing position, the load path from the wall panel to the floor is through the damper assembly and base.

6. The modular wall panel according to claim 5, wherein the leg assembly further comprises a rod and a load bearing bracket, the load bearing bracket, the spring, the damper assembly and the base being mounted on the rod, and wherein in the adjustment position the load path from the wall panel to the floor is through the load bearing bracket, the spring, the damper assembly and the base, and wherein in the load bearing position the load path from the wall panel to the floor is through the load bearing bracket, the damper assembly and the base.

7. The modular wall panel according to claim 6, wherein in the adjustment position the load bearing bracket is spaced from the damper assembly with the spring extending between the load bearing bracket and the damper assembly, and wherein in the load bearing position the load bearing bracket is in contact with the damper assembly.

8. The modular wall panel according to claim 6, wherein the damper assembly comprises an adjustment device to adjust the position of the damper assembly on the rod, thereby to move the leg assembly from the adjustment position to the load bearing position.

9. The modular wall panel according to claim 1, where the wall panel comprises a laminate structure, comprising a facing layer and an insulation layer.

10. The modular wall panel according to claim 9, wherein the first and second vertical edges are provided with male and female profiles which extend into the insulation layer.

11. The modular wall panel according to claim 9, wherein at least one of conduit, wiring and pipework is integrated into the laminate structure.

12. The modular wall panel according to claim 11 comprising a protective cover plate covering at least one of the conduit, the wiring and the pipework.

13. A modular wall comprising:
the modular wall panel as recited in claim 1; and
at least one additional modular wall panel, each additional modular wall panel comprising first and second vertical edges, a top edge and a bottom edge,
wherein cooperating elements of adjacent wall panels are engaged.

14. The modular wall according to claim 13, wherein the leg assembly further comprises a base;
wherein in the adjustment position, the load path from the wall panel to a floor is through the spring, damper assembly and base; and
wherein in the load bearing position, the load path from the wall panel to the floor is through the damper assembly and base.

15. The modular wall according to claim 13, wherein
the first and second vertical edges are shaped to form a male-female connection between adjacent wall panels;
adjacent wall panels are joined together using adhesive;
each vertical edge is provided with cooperating elements, which in use engage with a cooperating element on an adjacent wall panel to pull the two wall panels together whilst the adhesive cures.

16. The modular wall according to claim 13, wherein the modular wall is in compression both vertically and horizontally.

17. The modular wall according to claim 13, wherein the cooperating elements comprise a cam action to pull the two wall panels together.

18. The modular wall according to claim 13, wherein one of the first and second vertical edges of the wall panel is provided with a vertical groove on its front face, to allow space for at least one of adhesive and filler.

19. The modular wall according to claim 13, where the wall panel comprises a laminate structure, comprising a facing layer and an insulation layer.

20. The modular wall according to claim 19, wherein the first and second vertical edges are provided with male and female profiles which extend into the insulation layer.

21. The modular wall according to claim 19, wherein at least one of conduit, wiring and pipework for services are integrated into the laminate structure.

22. The modular wall according to claim 21 comprising a protective cover plate covering the at least one of conduit, wiring and pipework.

23. The modular wall according to claim 13, comprising at least one spreader bracket to push two adjacent wall panels apart.

24. The modular wall according to claim 23, comprising a cover strip to cover a gap created by the spreader bracket.

25. The modular wall according to claim 13, wherein the modular wall is positioned in front of an existing wall and a sealed cavity is created between the existing wall and the modular wall.

26. The modular wall according to claim 25 comprising a ventilation system, wherein at least one of an inlet and an outlet of the ventilation system is located in at least one said wall panel, an air source is provided into the sealed cavity and wherein the sealed cavity acts as an air plenum for the ventilation system.

27. A method of erecting a modular wall, the method comprising:
positioning the modular wall panel as recited in claim 1, and at least a second structure, and connecting the modular wall panel to the second structure with the leg assembly in the adjustment position; and
putting the leg assembly into the load bearing position when the modular wall panel and the second structure are in position.

28. The method according to claim 27, comprising:
applying adhesive to the first and second vertical edges;
positioning the wall panels in their desired location;
engaging cooperating elements in adjacent wall panels and allowing the adhesive to cure whilst the adjacent wall panels are clamped together.

29. The method according to claim 27, the method comprising inserting a spreader bracket between adjacent wall panels to force the adjacent wall panels apart and thereby take up any tolerance.

30. The method according to claim 27, the method comprising:
filling a vertical groove on the front face of the wall panel at one of the first and second vertical edges with at least one of adhesive and filler.

31. The method according to claim 30, the method comprising removing excess at least one of adhesive and filler to leave a flush front surface of the modular wall.

* * * * *